United States Patent [19]
Hashimoto et al.

[11] Patent Number: 5,194,798
[45] Date of Patent: Mar. 16, 1993

[54] SERVO CIRCUIT CONTROL METHOD AND SYSTEM

[75] Inventors: Shuichi Hashimoto, Tokyo; Tohru Shinohara, Kawasaki, both of Japan

[73] Assignee: Fujitsu Limited, Kawasaki, Japan

[21] Appl. No.: 460,668

[22] Filed: Jan. 3, 1990

[30] Foreign Application Priority Data

Jan. 10, 1989 [JP] Japan .................................. 1-003188
Jan. 10, 1989 [JP] Japan .................................. 1-003190
Mar. 17, 1989 [JP] Japan .................................. 1-065756

[51] Int. Cl.$^5$ .............................................. G05B 11/18
[52] U.S. Cl. ....................................... 318/594; 318/603
[58] Field of Search ........................... 360/70, 75, 77; 369/44.2 S, 44; 318/560, 561–565, 569, 590–592, 594, 600, 601, 602, 603, 626, 652, 653

[56] References Cited

U.S. PATENT DOCUMENTS

| | | | |
|---|---|---|---|
| 4,096,425 | 6/1978 | Brown et al. | 318/561 |
| 4,184,108 | 1/1980 | Sordello et al. | 318/618 |
| 4,237,502 | 12/1980 | Erickson et al. | 318/561 X |
| 4,288,731 | 9/1981 | Lee et al. | 318/561 X |
| 4,578,723 | 3/1986 | Betts et al. | 360/77 |
| 4,609,855 | 8/1986 | Andrews et al. | 318/561 |
| 4,697,127 | 9/1987 | Stich et al. | 318/561 |
| 4,710,865 | 12/1987 | Higomura | 318/594 X |
| 4,724,369 | 2/1988 | Hashimoto | 318/561 |
| 4,988,933 | 7/1991 | Ogawa | 318/561 |

*Primary Examiner*—William M. Shoop, Jr.
*Assistant Examiner*—David Martin
*Attorney, Agent, or Firm*—Staas & Halsey

[57] ABSTRACT

A control system for a servo circuit has a speed control unit for controlling the speed of a servo object, a position control unit for controlling the position of the servo object, a switching unit for switching between the speed control unit and the position control unit, a main control unit, and optionally a speed zero detection circuit which compares the real speed and a slice level and detects if the real speed is less than a fixed value. The control system includes a method for producing a target speed using an amount of movement X in an amount of movement d as a remaining amount of movement, and producing a target speed of equal speed for a remaining amount of movement Y. Another method includes controlling the switching of position control of the servo circuit, determining if the conditions for switching to position control are met during speed control, monitoring conditions for switching for a fixed time X after detection of the switching conditions, switching position control when the switching conditions are met for the fixed time X, and returning to determine the switching conditions in accordance with the collapse of switching conditions within the fixed time. An additional method includes outputting a target speed using an amount of movement X as a remaining amount of movement, outputting a target speed of an equal speed of a remaining amount of movement Y, and switching the value of the slice level during the start of movement and after the movement.

14 Claims, 18 Drawing Sheets

COARSE/FINE SWITCHING SIGNAL

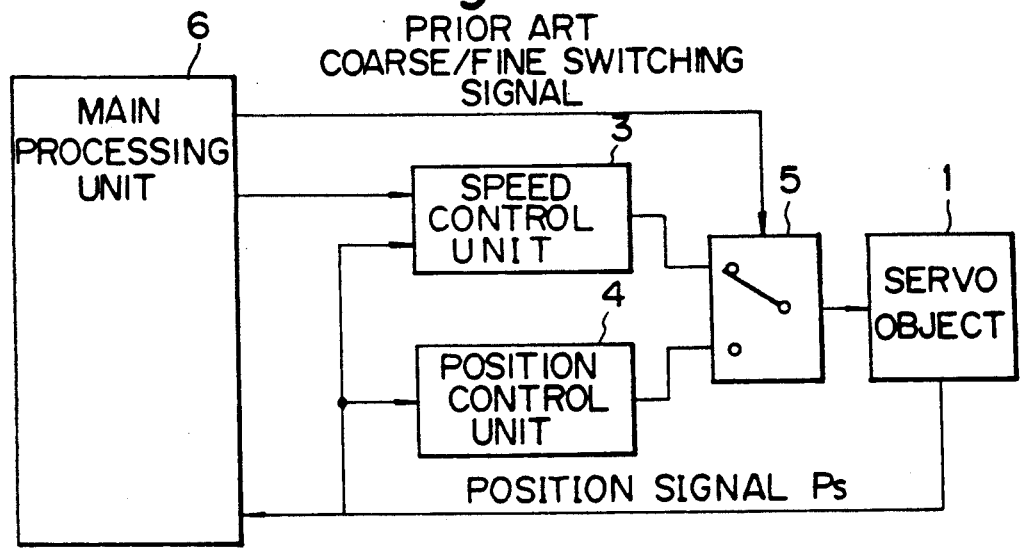
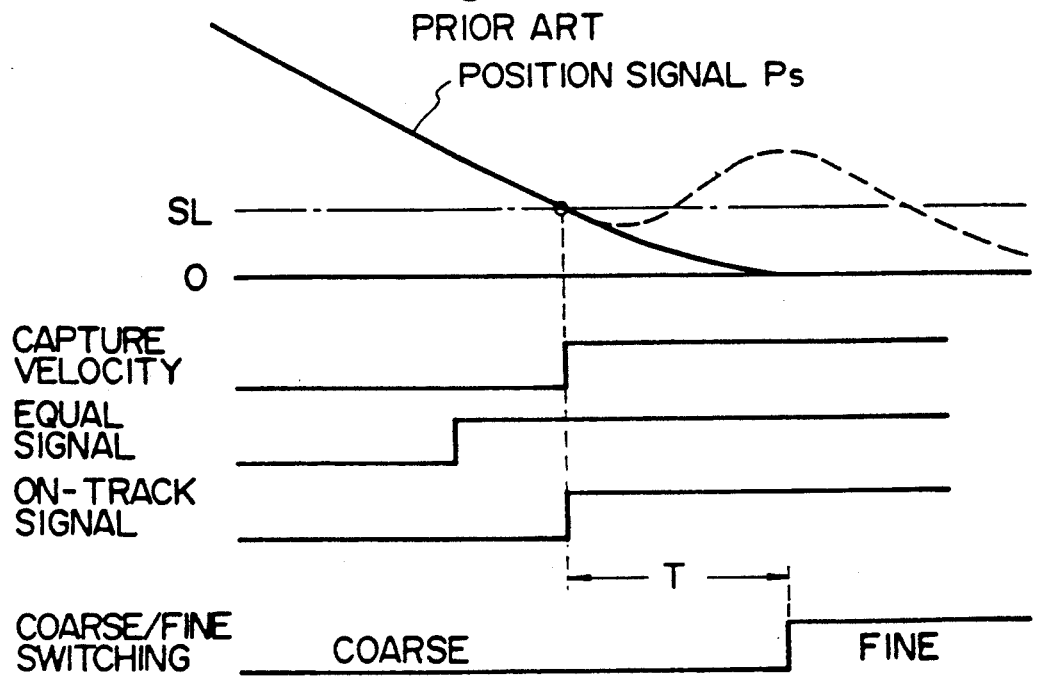

SERVO CIRCUIT CONTROL METHOD AND SYSTEM

BACKGROUND OF THE INVENTION

1. Field of the Invention

The present invention relates to a control system for a servo circuit which performs speed control and then position control over an object under servo control (hereinafter) referred to as a "servo object"). More particularly, the present invention relates to a method for controlling the control speed of the servo object based on an error between a target speed and a real speed. The present invention also relates to a method for switching from speed control to position control, and a method for switching from speed control to position control when the real speed falls below a fixed value.

2. Description of the Related Art

Wide use is being made of servo circuits for the positioning of magnetic heads on tracks of magnetic disk devices and other precision positioning. In such servo circuits, there is a desire for a technique enabling stable positioning even at high movement speeds. Also, there is a demand for a method for stable switching control even in the face of external disturbances and other influences when switching from speed control to position control.

In recent years, magnetic disk apparatuses have tended to have higher speed positioning during seek (movement) operations. Due to these higher speeds, there is a need for increasing the degree of acceleration during deceleration. If the degree of acceleration during deceleration is increased, the entry speed at the final stage of the speed control will not be constant, but will fluctuate in accordance with the amount of the seek operation (movement). When the degree of acceleration during deceleration is small and a relatively long time is taken for the deceleration (for example, when over two times the acceleration time is taken during the deceleration), the entry speed substantially remains the same. But, if the degree of acceleration during deceleration is made large and the positioning time shortened, the entry speed fluctuates in accordance with the amount of the seek operations. These fluctuations in the entry speed create fluctuations in the amount of overshoot, invite fluctuations and prolongation of the convergence time in the fine control (position control), and end up halving the effects of the reduction of time.

Also, once the switching conditions are reached, the position control is switched unconditionally after a fixed time. Therefore, position control is switched even if the switching conditions only appear to have been reached due to disturbances in the position signal of a servo object due to external disturbances or if the position signal is disturbed by external disturbances after that. In such cases, overshooting or undershooting occur, position errors easily occur, too much time is taken for positioning, the reliability of the position control (seek) decreases, and the positioning (seek) time is increased.

SUMMARY OF THE INVENTION

The present invention has as a first object the reduction of the fluctuations in the entry speed and the reduction of the positioning time even with a large degree of acceleration during deceleration.

The present invention has as a second object the improvement of the reliability of position control and the reduction of the positioning time.

The present invention has as a third object, in addition to the first object, the prevention of an erroneous operation at the time of switching from speed control to position control.

The present invention realizes the first object by providing a control system of a servo circuit having a speed control unit for controlling the speed of a servo object based on an error of a given target speed and real speed; a position control unit for controlling the position of the servo object; a switching unit for switching the connections of the servo object between the speed control unit and the position control unit; and a main processing unit which revises the remaining amount of movement based on a position signal from the servo object and generates a target speed in accordance with the remaining amount of movement. A method is provided for speed control including a step of producing a target speed using an amount of movement (X) in an amount of movement (d) as a remaining amount of movement and a step of producing, after producing a target speed for movement by the amount of movement (X), a target speed of equal speed for the remaining amount of movement (Y).

It realizes the second object by the provision of a control system of a servo circuit having a speed control unit for controlling the speed of a servo object based on an error of a given target speed and real speed; a position control unit for controlling the position of the servo object; a switching unit for switching the connections of the servo object between the speed control unit and the position control unit; and a main processing unit which controls the switching of the switching unit. A featuring a method for controlling the switching of the position control of the servo circuit includes steps wherein the main processing unit judges if the conditions for switching to the position control stand during the speed control; a step of monitoring the conditions for switching for a fixed time (T) after detection of the standing of the switching conditions; a step of switching to the position control in accordance with the standing of the switching conditions for the fixed time (T); and a step of returning to the step of judgement of the switching conditions in accordance with the collapse of the switching conditions within the fixed time.

It realizes the third object by the provision of a control system of a servo circuit having: a speed control unit for controlling the speed of a servo object based on an error of a given target speed and real speed; a position control unit for controlling the position of the servo object based on a position signal from the servo object; a switching unit for switching the connections of the servo object between the speed control unit and the position control unit; a main processing unit which revises the remaining amount of movement based on the position signal and generates a target speed in accordance with the remaining amount of movement; and a speed zero detection circuit which compares the real speed and a slice level and detects if the real speed is less than a fixed value. Based on an output of the speed zero detection circuit, the main processing unit switches the switching unit from speed control to position control. The control system produces and outputs a target speed using a difference X included in a difference d as a remaining a difference, produces and outputs a target speed of an equal speed of the remaining difference Y (X+Y=d), and switches the value of the slice level at the start of movement and after movement.

BRIEF DESCRIPTION OF THE DRAWINGS

FIG. 2A is a block diagram of another prior art servo control system;

FIG. 2B is a diagram of various characteristics of the device in FIG. 2A;

DESCRIPTION OF THE PREFERRED EMBODIMENTS

Before describing the preferred embodiments, a more detailed explanation will be given of the prior art.

Figure 1A:
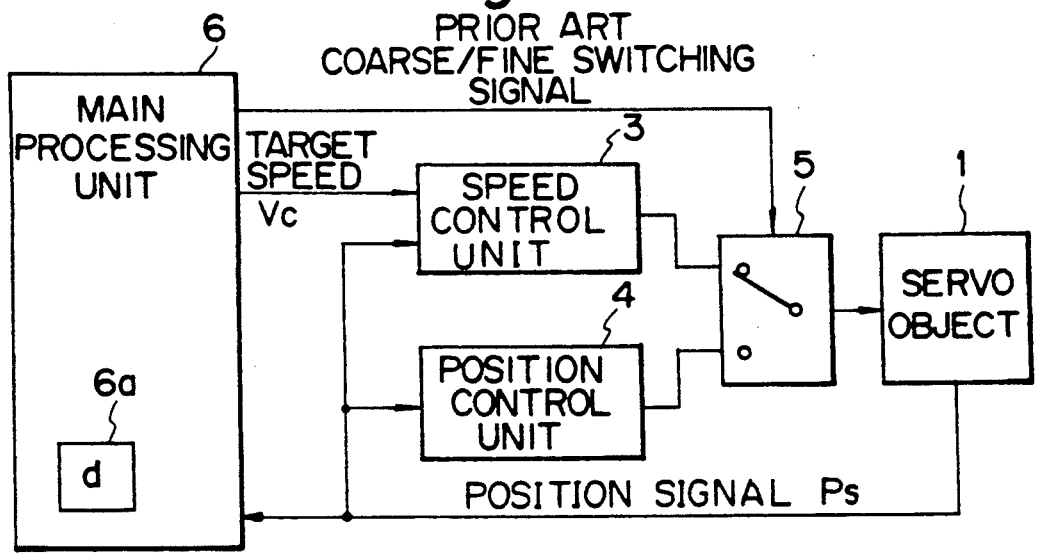
FIG. 1A is a block diagram of a prior art servo control system.
Figure 1B:
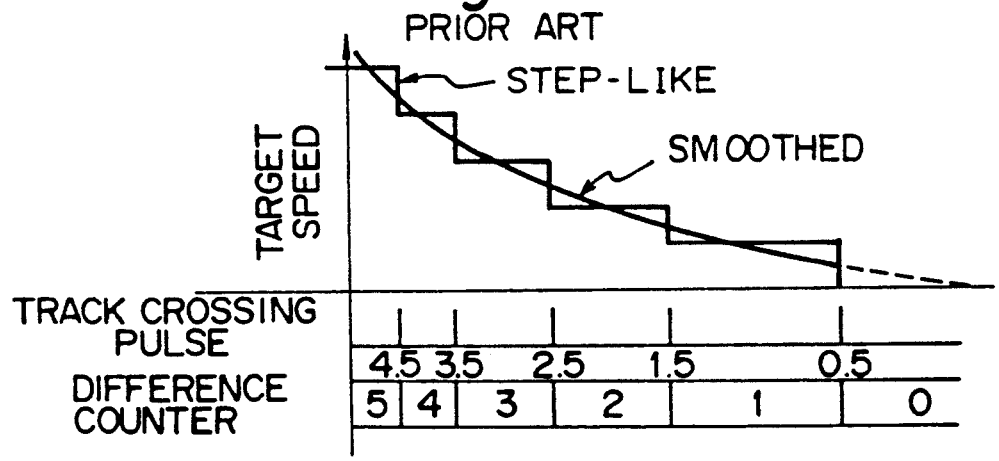
FIG. 1B is a graph of the target speed and amount of movement for the circuit in FIG. 1A.
Figure 1C:
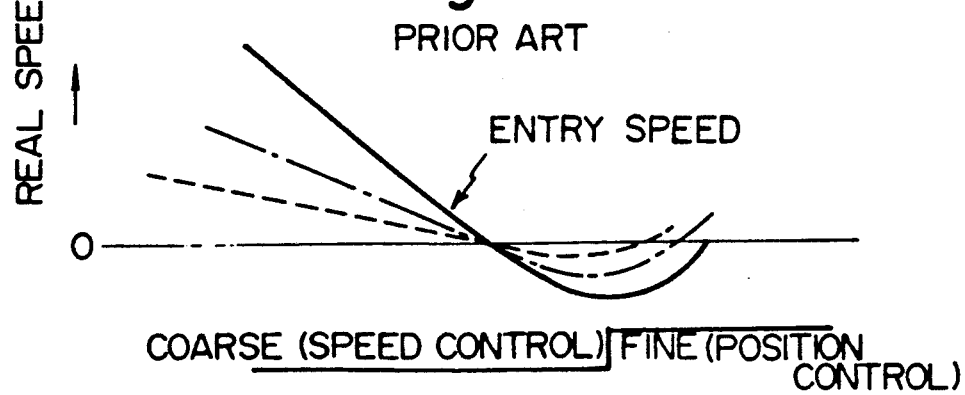
FIG. 1C is a graph of the entry speed at the final stage of speed control for the servo control system in FIG. 1A.

FIGS. 1A to 1C are prior art block diagrams and timing diagrams. As shown in FIG. 1A, the servo circuit has a speed control unit 3 for controlling the speed of a servo object; a position control unit 4 for controlling the position of the servo object 1; a switching unit 5 for switching the connections of the servo object 1 between the speed control unit 3 and the position control unit 4; and a main processing unit 6 which controls the switching of the switching unit 5 in accordance with the state of the servo object 1.

The main processing unit 6 has a difference counter 6a which stores a difference (amount of movement) d and changes the target speed Vc input to the speed control unit 3 in accordance with the remaining difference d of the difference counter 6a as shown in FIG. 1B.

That is, the difference counter 6a is decremented in response to a position signal (track crossing pulse) of the servo object and produces a step-like target speed in accordance with its content, i.e., the remaining difference d.

The step-like target speed becomes zero for 0.5 track before the target track in a magnetic disk apparatus. It is smoothed by a smoothing circuit in of the speed control unit 3 and becomes a continuous curve as shown by FIG. 1B.

In this way, in the prior art, the target speed was produced in accordance with the difference d for speed control.

In recent years, however, magnetic disk apparatuses, etc., have tended to have higher positioning speeds during seek (movement) operations. Due to these higher speeds, there is a need for increasing the degree of acceleration during deceleration.

If the degree of acceleration during deceleration is increased, the entry speed at the final stage of the speed control will not be constant, as shown in FIG. 1C, but will fluctuate in accordance with the amount of the seek operation (movement).

When the degree of acceleration during deceleration is small and a relatively long time is taken for the deceleration (for example, when over two times the acceleration time is taken for the deceleration), the entry speed substantially remains the same. But, if the degree of acceleration during the deceleration is made large and the positioning time shortened, the entry speed fluctuates in accordance with the amount of the seek operation.

These fluctuations in the entry speed create fluctuations in the amount of overshoot, as shown in FIG. 1C, invite fluctuations and prolongation of the convergence time during the fine control (position control), and end up halving the effects of the reduction of time.

FIGS. 2A and 2B are a block diagram and timing chart, respectively, of another prior art.

As shown in FIG. 2A, like the first prior art shown, the servo circuit has a speed control unit 3 for controlling the speed of a servo object 1; a position control unit 4 for controlling the position of the servo object 1; a switching unit 5 for switching the connections of the servo object 1 between the speed control unit 3 and the position control unit 4; and a main processing unit 6 which controls the switching of the switching unit 5 in accordance with the state of the servo object 1.

In such a servo circuit, in the prior art, when conditions were reached for switching from speed (coarse) control to position (fine) control, the main processing unit 6 operated the switching unit 5 unconditionally using the switching signal to change from speed control to position control. For example, in a magnetic disk apparatus, as shown in FIG. 2B, the conditions for switching are considered to stand when, among a capture velocity signal indicating that the speed of the servo head has fallen below the target speed, an equal signal indicating that the servo head is above the same cylinder as the target cylinder, and an on-track signal indicating that the servo head is within a fixed distance of the target position, two of the signals, i.e., the capture velocity signal and equal signal, or three of the signals i.e., the capture velocity signal, equal signal, or on-track signal, stand. A fixed time T (for example, 500 μsec) after the switching conditions, position (fine) control is switched.

In this prior art, however, once the switching conditions are reached, the position control is switched to unconditionally after a fixed time. Therefore, position control is switched to even if the switching conditions only appear to have been reached due to disturbances in the position signal Ps of the servo object 1 due to external disturbances or if the position signal Ps is disturbed by external disturbances after that.

In such cases, as shown by the dotted line of FIG. 2B, overshooting or undershooting occurs, position errors easily occur, too much time is taken for positioning, the reliability of the position control (seek) falls, and an increase in the positioning (seek time is invited.

The aspects of the present invention will now be explained.

Figure 3A:
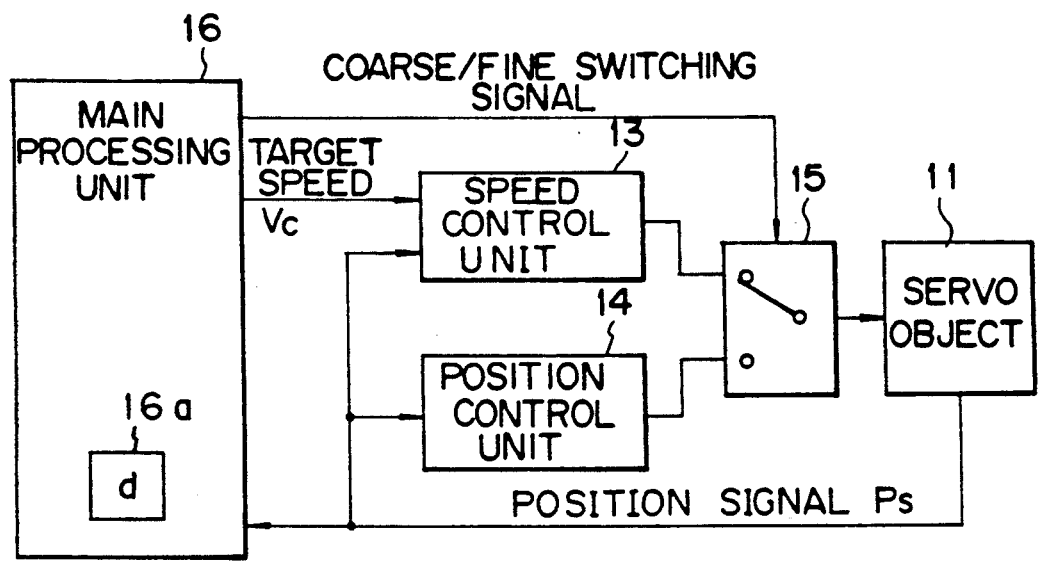
FIG. 3A is a block diagram of a servo control system according to a first embodiment of the present invention.

According to a first embodiment of the present invention, there is provided, as shown in FIG. 3A, a control system of a servo circuit having a speed control unit 13 for controlling the speed of a servo object 11 based on an error of a given target speed and real speed; a position control unit 14 for controlling the position of the servo object 11; a switching unit 15 for switching the connections of the servo object 11 between the speed control unit 13 and the position control unit 14; and a main processing unit 16 which revises the remaining amount of movement based on a position signal Ps from the servo object 11 and generates a target speed Vc in accordance with the remaining amount of movement. The control system features a method for speed control of the servo circuit including a step of producing a target speed using a difference X included in a difference d as a remaining difference and a step of producing, after producing a target speed for movement by the difference X, a target speed of equal speed for the remaining difference Y (X+Y=d).

Figure 3B:
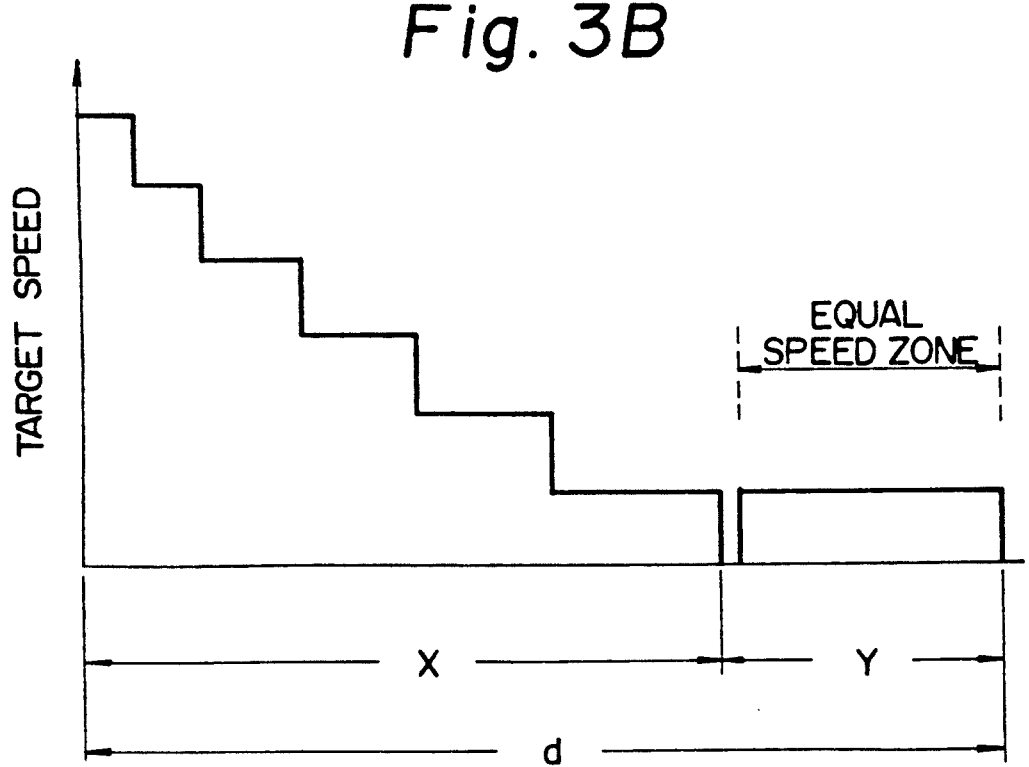
FIG. 3B is a diagram of the target speed and amount of movement in the circuit in FIG. 3A.

In FIG. 3B, which explains the mode of operation of the first aspect of the present invention, a target speed is produced using an amount of movement X in an amount of movement d as the remaining amount of movement. A target speed of an equal speed is produced for the remaining amount of movement Y. The equal speed target speed is used to absorb fluctuations in the entry speed, which fluctuates according to the amount of movement, and adjustment is made to substantially the same entry speed.

Therefore, even if the degree of acceleration during deceleration is made large and a higher speed is attempted, no fluctuations occur in the entry speed, the amount of overshoot is kept constant, and stable position is made possible even at a high speed.

Figure 4:
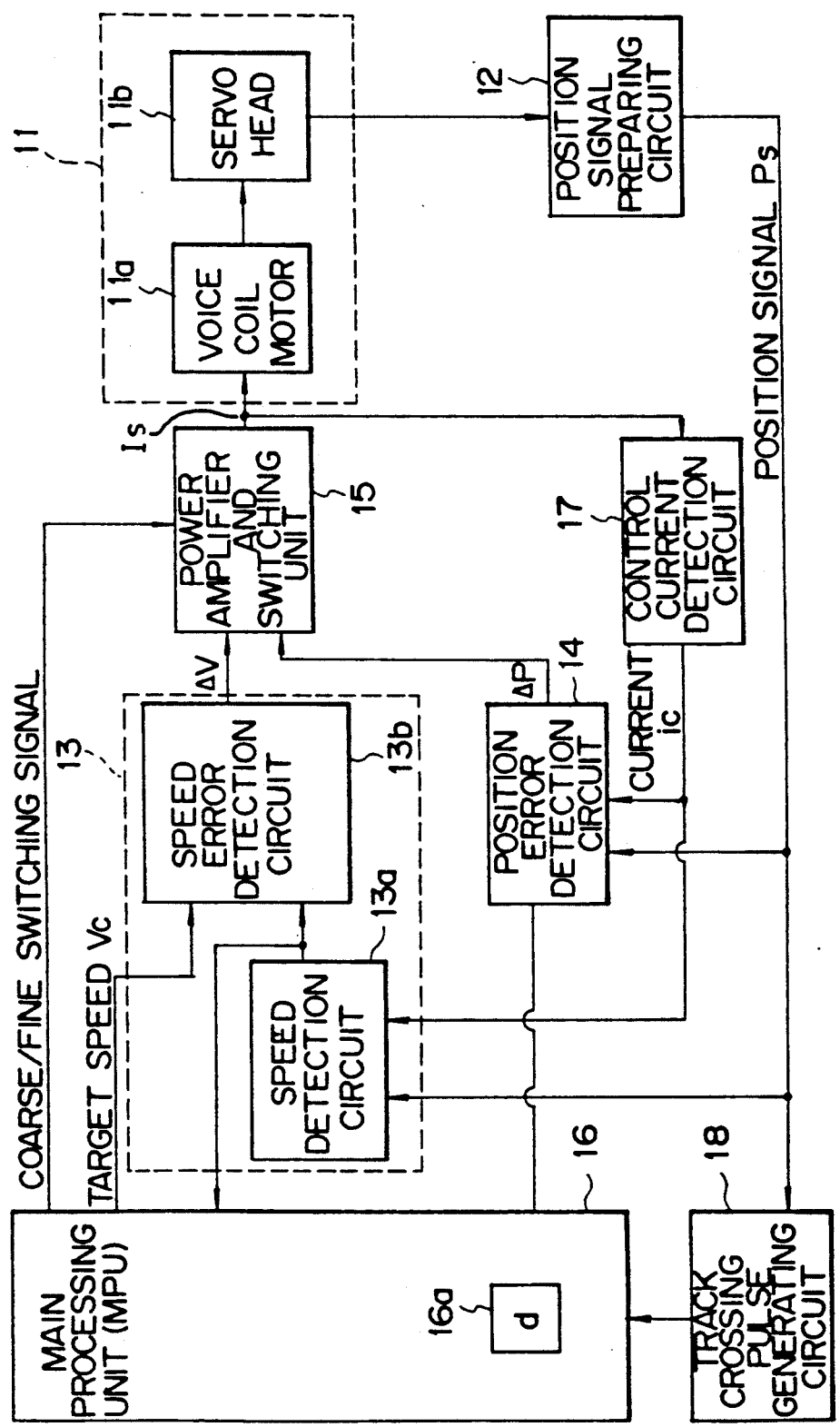
FIG. 4 is a more detailed block diagram of the first embodiment according to the present invention.

FIG. 4 is a more detailed block diagram of the first embodiment according to the present invention.

In FIG. 4, portions the same as those shown in FIGS. 1A to 1C and FIGS. 3A and 3B are given the same reference numerals. Reference numeral 11 is a servo object, which has a voice coil motor 11a and a servo head 11b moved by the voice coil motor 11a. Reference numeral 12 is a position signal preparing circuit, which prepares a position signal from a signal read by the servo head 11b.

Reference numeral 13a is a speed detection circuit, which detects a real speed Vr from the position signal Ps and the later mentioned detection current ic. Reference numeral 13b is a speed error detection circuit, which generates a speed error ΔV between the later mentioned target speed Vc and the real speed Vr and performs speed control.

Reference numeral 14 is a position error detection circuit, which generates a position error signal ΔP from the position signal Ps and the detection current ic and performs position control. Reference numeral 15 is a power amplifier and switching unit, which has a changeover switch and power amplifier and switches connections of the speed error detection circuit 13b or position error detection circuit 14 to the servo object 11 by a coarse (speed control)/fine (position control) switching signal.

Reference numeral 16 is a main processing unit, which is formed by a microprocessor and which generates a target speed curve Vc in accordance with the amount of movement. The main processing unit 16 also monitors the position of the servo object 11 by the later mentioned track crossing pulses to generate a signal for switching from coarse control (speed control) to fine control (position control) near the target position. The reference numeral d is a counter for storing the difference amount.

Reference numeral 17 is a control current detection circuit, which detects the control current Is of the power amplifier 15 and generates a detection current signal ic. Reference numeral 18 is a track crossing pulse generating circuit, which generates track crossing pulses from the position signal Ps and outputs them to the main processing unit 16.

Figure 5:
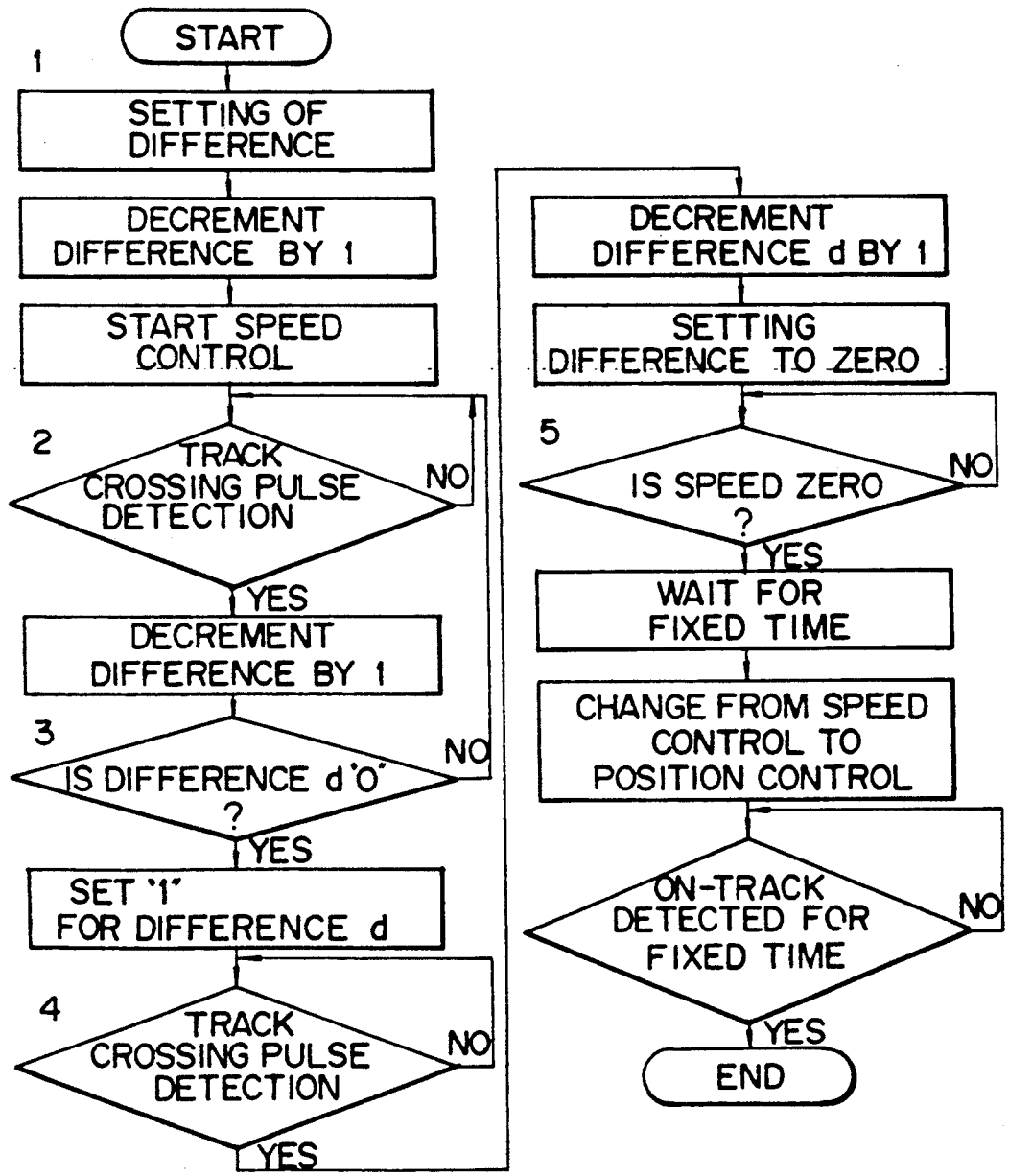
FIG. 5 is a flow chart of the seek processing of the first embodiment according to the present invention.
Figure 6A:
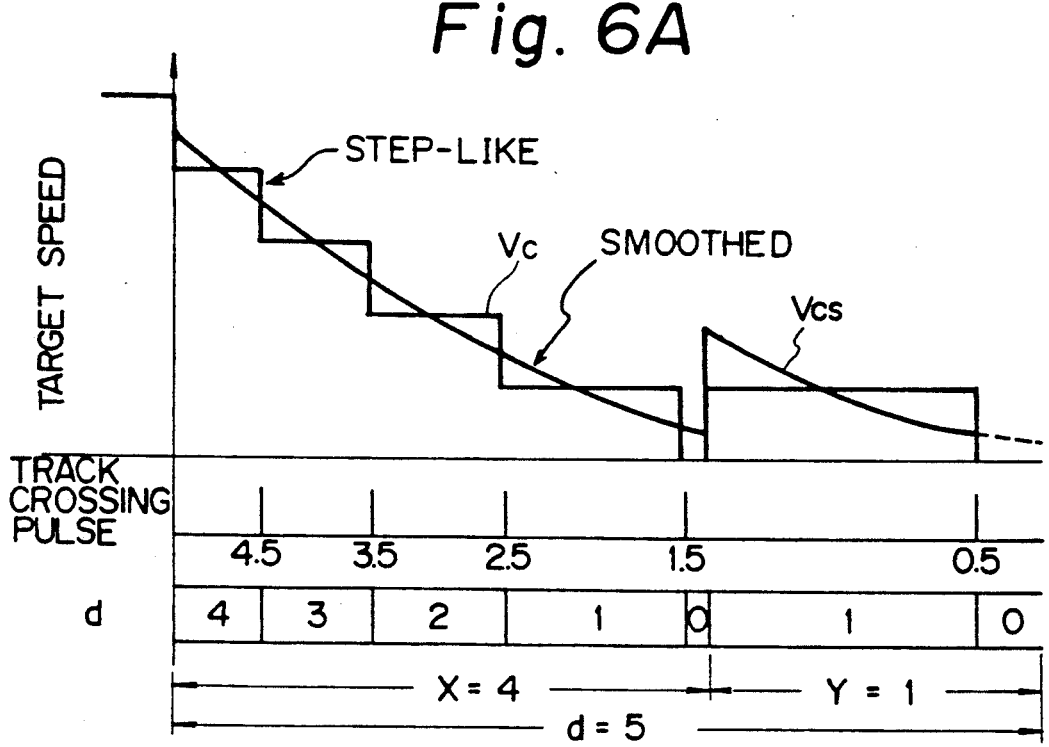
FIGS. 6A and 6B are diagrams of the target speed and amount of movement and position, respectively operation of the first embodiment according to the present invention.
Figure 6B:
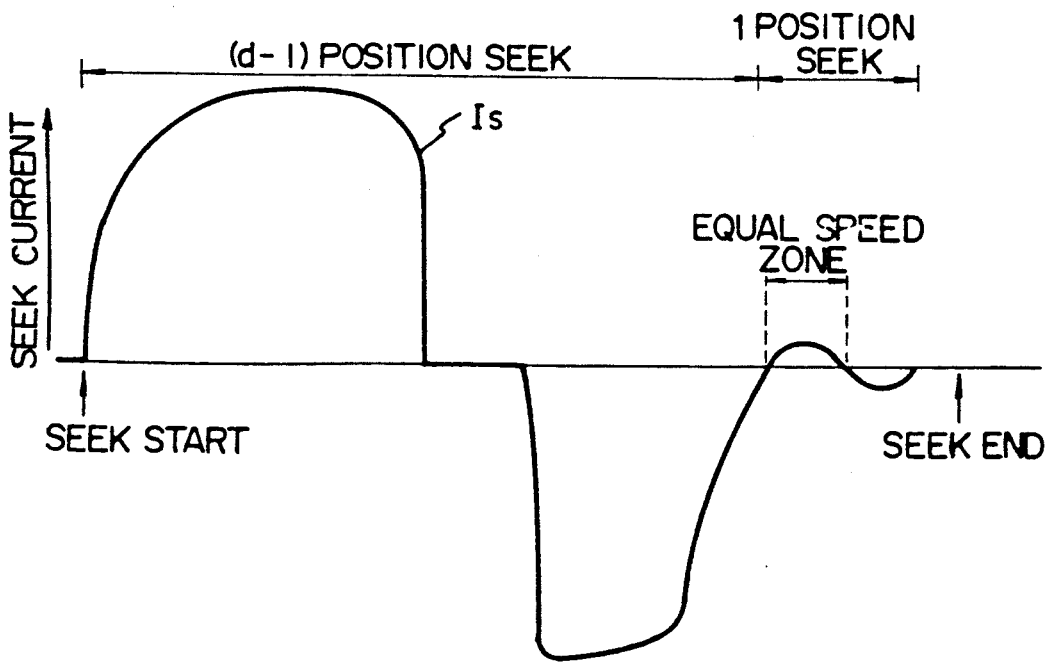

FIG. 5 is a flow chart of the seek processing of the first embodiment according to the present invention. FIGS. 6A and 6B are waveform diagrams of the operation of the first embodiment of the present invention. Referring to FIG. 5, 1 The main processing unit (hereinafter referred to as the "MPU") 16 calculates an amount of movement (difference) d from the target track position and the current track position and sets it in the difference counter 16a (FIG. 4).

Next, the difference d of the difference counter 16a is decremented by "1". That is, the difference d is reduced by "1" in advance.

Then the MPU 16 generates a target speed according to the difference d to start the speed control 2 the MPU 16 monitors the track crossing pulses of the track crossing pulse generating circuit 18 and when detecting a track crossing pulse, revises the content of the difference counter 16a to (d-1) and issues a target speed according to that difference d.

3 The MPU 16 judges if the difference d is zero and if not zero returns to step [2].

On the other hand, if the MPU 16 judges that the difference is zero, it judges that the seek operation of the difference (d-1) is completed, sets "1" in the difference counter 16a so as to perform the seek operation for the remaining "1", and generates a target speed according to this difference d.

4 Next, the MPU 16 monitors the track crossing pulses from the track crossing pulse generating circuit 18 and it if detects a track crossing pulse, decrements the difference d of the difference counter 16a by "1".

By this, the difference d of the difference counter 16a becomes zero, so the MPU 16 sets the difference zero.

That is, it judges that the seek operation of the difference of 1 is completed.

5 Next, the MPU 16 judges if the real speed of the speed detection circuit 3a is zero and waits until it is zero.

When the real speed becomes zero, the MPU 16 waits a fixed time, then switches from the speed control to position control by a coarse/fine switching signal.

Then, the MPU 16 monitors the on-track signal of the position error detection circuit 14 (signal showing that servo head is within fixed distance of target track) and if it detects an on-track state for a fixed period, ends the operation judging that the positioning is completed.

Explaining this operation referring to FIGS. 6A and 6B, first the amount of movement d (=5) is decremented by "1" and a seek operation for the position (d-1) (=4) is executed.

After this, a seek operation for the position of the remaining "1" is executed.

This seek operation of the position of the remaining "1" means movement of a position of "1", so an equal speed target speed is given and an equal speed seek operation is performed.

That is, under the conditions of X=d-1 and Y=1, the seek operation of the difference d is split into two seek operations.

Showing this by tracks of a magnetic disk, the seek operation of the position (d-1) is performed until 1.5 tracks before the target track. Then a seek operation of a position of 1 of an equal speed is performed from before the 1.5 track to before the 0.5 track before. The seek current becomes as shown in FIG. 6B.

The target speed Vc from MPU 16 takes a step-like form, as shown by FIG. 6A, of "4", "3", "2", "1", and "0", then "1" and "0". By running this through a smoother circuit, not shown, in the speed error detection circuit 13b, the continuous speed Vcs of FIG. 6A is obtained, which draws a curve which decreases from d=4 to d=0, rises at d=1 after the d=0 and then decreases again.

Therefore, even when the degree of acceleration during deceleration is large and the entry speed fluctuates, the fluctuations are absorbed by the fixed speed, equal speed seek zones and the speed control and can be ended at substantially the same entry speed.

As explained above, according to the first embodiment of the present invention, since the target speed is produced using the difference X included in the difference d as the remaining and an equal speed target speed is produced for the remaining difference Y, the fluctuations in the entry speed, which fluctuates according to the difference, are absorbed by the equal speed seek zones and substantially the same entry speed can be obtained. Even with a large degree of acceleration during deceleration, it is possible to keep the overshoot constant and achieve high speed, stable positioning.

Figure 7A:
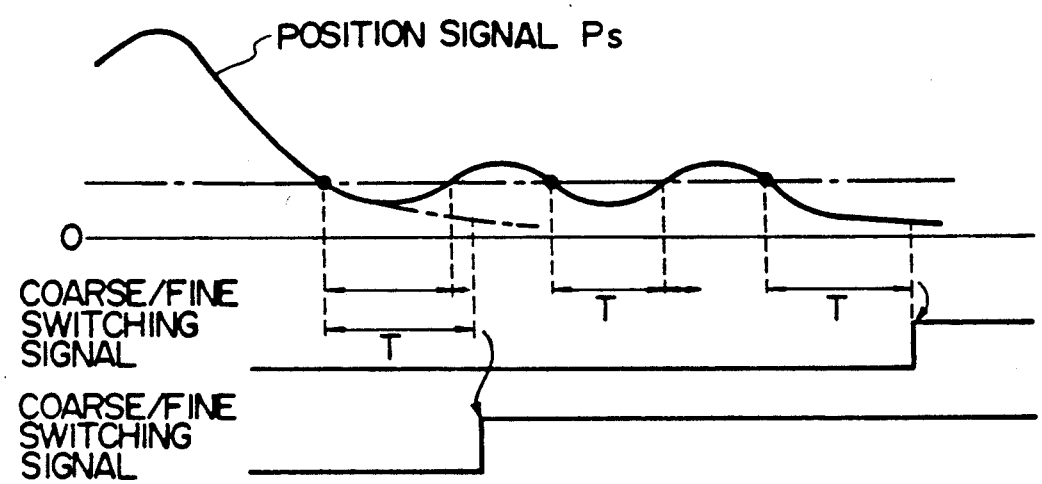
FIGS. 7A and 7B are timing diagrams of the position signal of a second embodiment according to the present invention.
Figure 7B:
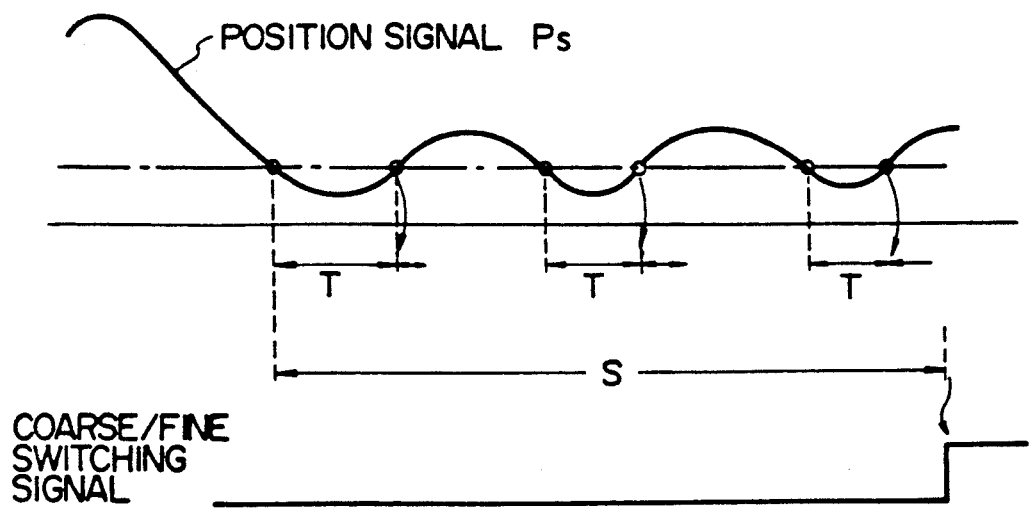
Figure 8:
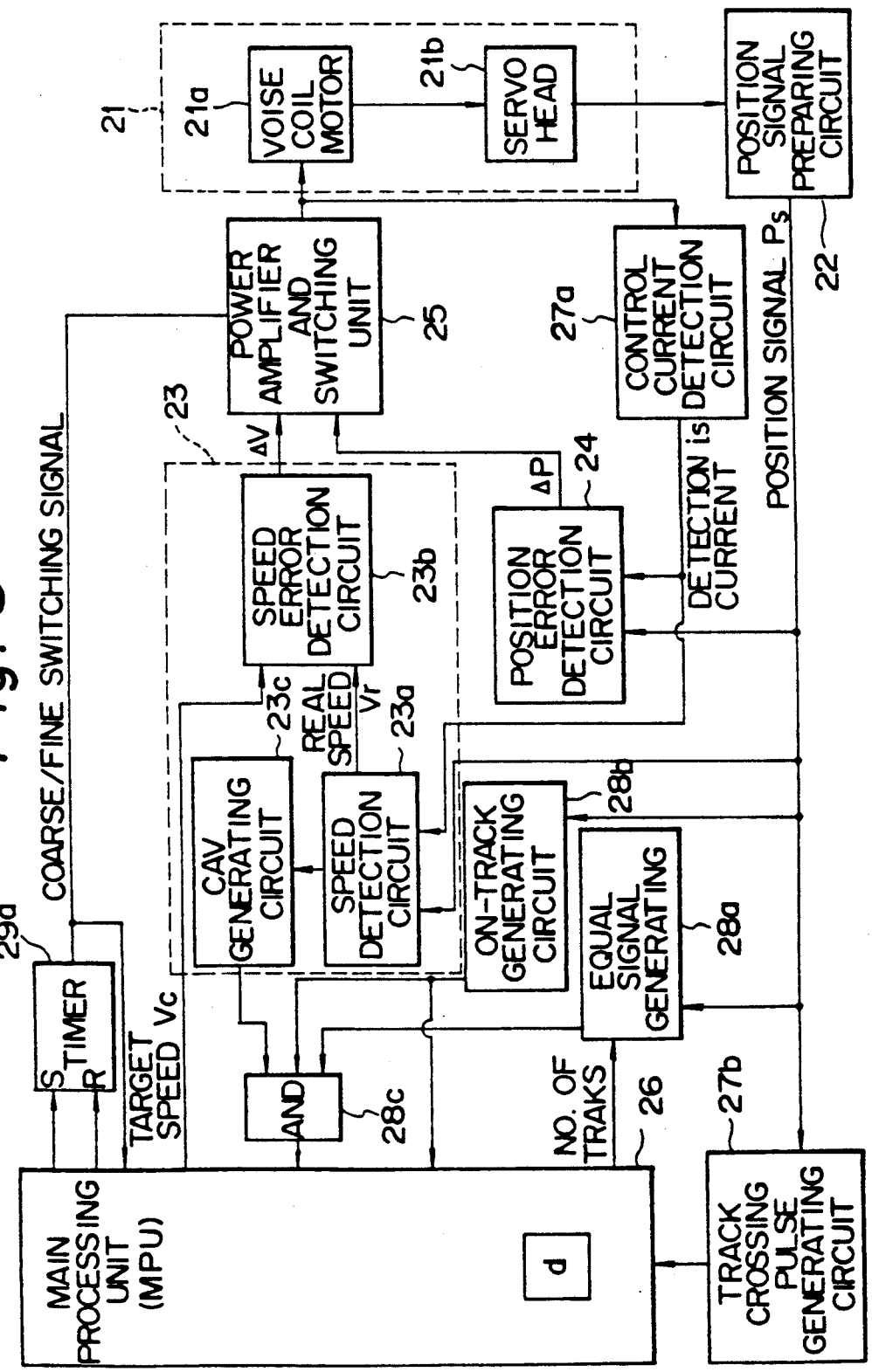
FIG. 8 is a block diagram of the second embodiment according to the present invention.

According to a second embodiment of the present invention as shown in FIGS. 7A, 7B and 8, there is provided as shown in FIG. 8 a control system of a servo circuit having a speed control unit 23 for controlling the speed of a servo object 21; a position control unit 24 for controlling the position of the servo object 21; a switching unit 25 for switching the connections of the servo object 21 between the speed control unit 23 and the position control unit 24; and a main processing unit 26 which controls the switching of the switching unit 25.

A method for controlling the switching of the position control of the servo circuit includes a step wherein the main processing unit 26 judges if the conditions for switching to the position control stand during the speed control; a step of monitoring the conditions for switching for a fixed time T after detection of the standing of the switching conditions; a step of switching to the position control in accordance with the standing of the switching conditions for the fixed time T; and a step of returning to the step of judgement of the switching conditions in accordance with the collapse of the switching conditions within the fixed time.

Optionally, there may be included a further step for switching to the position control regardless of the standing or not standing of the switching conditions after the elapse of a second fixed time S after the detection of the standing of the switching conditions.

Explaining the mode of operation of the second embodiment of the present invention, position control is switched to if the switching conditions do not collapse within a fixed time T after the switching conditions once are reached, while the establishment of the switching conditions is waited for if the conditions collapse.

Therefore, there is not collapse of the switching conditions after the position control is switched to and it is possible to reduce error and shorten the positioning time.

Further, in the second embodiment of the present invention, if the position signal Ps is seriously disturbed, position control would not be switched to no matter how long a time has passed in the above mentioned control. Therefore, position control is automatically switched to after the elapse of a second fixed time S.

By this method, where there is a possibility of position error, this is better than indefinitely delaying the switching. Further, there is a possibility of positioning under position control.

Next, an embodiment of the second embodiment of the present invention will be explained.

FIG. 8 is a block diagram of the second embodiment according to the present invention.

In FIG. 8, reference numeral 21a is a voice coil motor, which performs a seek operation for the magnetic head; and reference numeral 21b is a servo head (magnetic head), which reads servo information on the servo surface of the magnetic disk.

Reference numeral 22 is a position signal preparing circuit, which prepares a position signal from a signal read by the servo head 21a.

Reference numeral 23a is a speed detection circuit, which detects a real speed Vr from the position signal Ps and the later mentioned detection current ic. Reference numeral 23b is a speed error detection circuit, which generates a speed error ΔV between the later mentioned target speed Vc and the real speed Vr and performs speed control. Reference numeral 23c is a capture velocity generating circuit, which detects that the real speed Vr is below a fixed target speed and generates a capture velocity signal CAV.

Reference numeral 24 is a position error detection circuit, which generates a position error signal ΔP from the position signal Ps and the detection current ic and performs position control. Reference numeral 25 is a power amplifier and switching unit, which has a changeover switch and power amplifier and switches connections of the speed error detection circuit 23 or position error detection circuit 24 to the servo object 21 by a coarse (speed control)/fine (position control) switching signal.

Reference numeral 26 is a main processing unit, which is formed by a microprocessor and which generates a target speed curve Vc in accordance with the amount of movement and also monitors the position of the servo object 21 by the later mentioned track crossing pulses to generate a signal for switching from coarse control (speed control) to fine control (position control).

Reference numeral 27a is a control current detection circuit, which detects the control current Is of the power amplifier 25 and generates a detection current signal ic, and reference numeral 27b is a track crossing pulse generating circuit, which generates track crossing pulses from the position signal Ps and outputs them to the main processing unit 26.

Reference numeral 28a is an equal signal generating circuit, which is set with a number of tracks for movement L from the main processing unit (MPU) 26, performs subtraction by the position signal Ps, and generates an equal signal indicating that the servo head 21b has reached the target cylinder when the number of tracks becomes zero. Reference numeral 28b is an on-track signal generating circuit, which generates an on-track signal from the position signal Ps showing that the servo head 21b has come within a fixed distance from the target position.

Reference numeral 28c is an AND gate, which takes the logical AND of the capture velocity signal CAV, the equal signal, and the on-track signal and generates a switching condition standing signal.

Reference numeral 29a is a timer, which is set by the MPU 26, times the fixed time T, and generates the coarse/fine switching signal.

Figure 9:
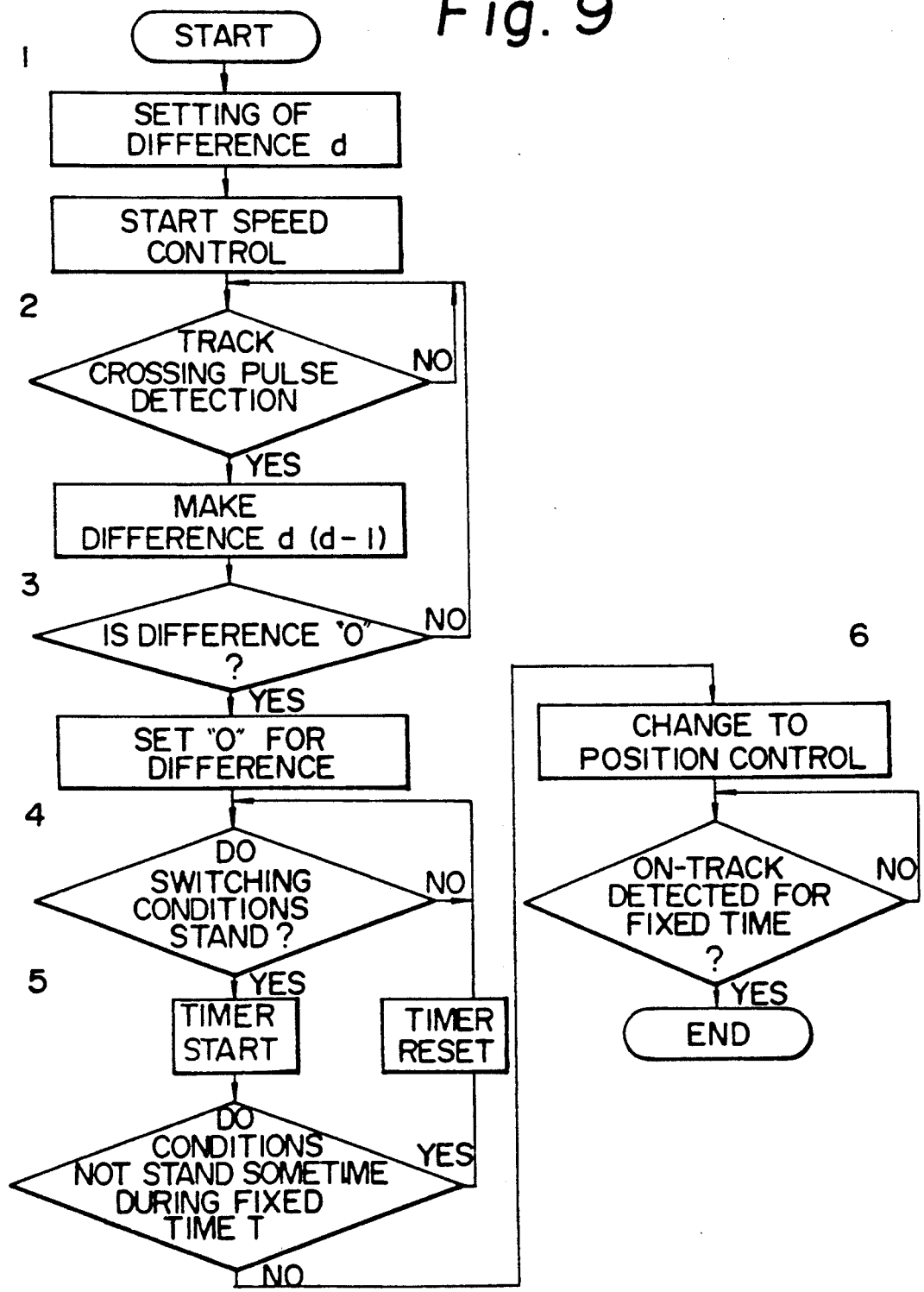
FIG. 9 is a flow chart of the processing of the second embodiment according to the present invention.

FIG. 9 is a flow chart of the seek processing of a third embodiment according to the present invention. Referring to FIG. 9:

1 The MPU 26 sets a difference d corresponding to the distance of movement in its built-in difference counter.

Then, the MPU 26 generates the target speed Vc and starts the speed control.

2 The MPU 26 monitors the track crossing pulses of the track crossing pulse generating circuit 27b and when detecting a track crossing pulse, and revises the content of the difference counter to (d-1).

3 The MPU 26 judges if the content of the difference counter is zero and if not zero returns to step 2.

On the other hand, if the content of the difference counter is zero, the MPU 26 sets the difference to "0".

4 The MPU 26 then monitors the switching condition standing signal of the AND gate 28c and judges if the switching conditions stand.

5 If the switching conditions stand, then the MPU 26 starts the timer 29a.

Further, during the time T of the timer 29a (about 500 μsec), the MPU 26 monitors the switching condition standing signal of the AND gate 28c and judges if the signal turns off in the time T.

If the switching condition standing signal turns off within the time T, the timer 29a is reset and the process returns to the judging of the standing of the switching conditions of step 4.

6 On the other hand, if the switching condition standing signal does not go off within the time T and the switching conditions still stand, the timer 29a is not reset.

Therefore, after the timer 29a counts the time T, it generates a coarse/fine switching signal to the switching unit 25 and switches to position control by the position error detection circuit 24.

Then, the MPU 26 monitors the on-track signal of the on-track signal generating circuit 28b and if the on-track signal turns on for a fixed time, judges that the seek operation is completed and ends the processing.

In this way, after the establishment of the switching conditions, the switching signal standing signal is monitored for a fixed time T and if the switching conditions do not collapse, the position control is switched. If the switching conditions do not collapse the process is repeated from the judgement of the standing of the switching conditions.

Therefore, even if the switching conditions are reached, if they are not sustained, the position control is not switched. Therefore, it is possible to eliminate the switching to position control caused by disturbed seek waveforms where switching conditions coincidentally stand and it is possible to achieve stable, high speed positioning.

Figure 10:
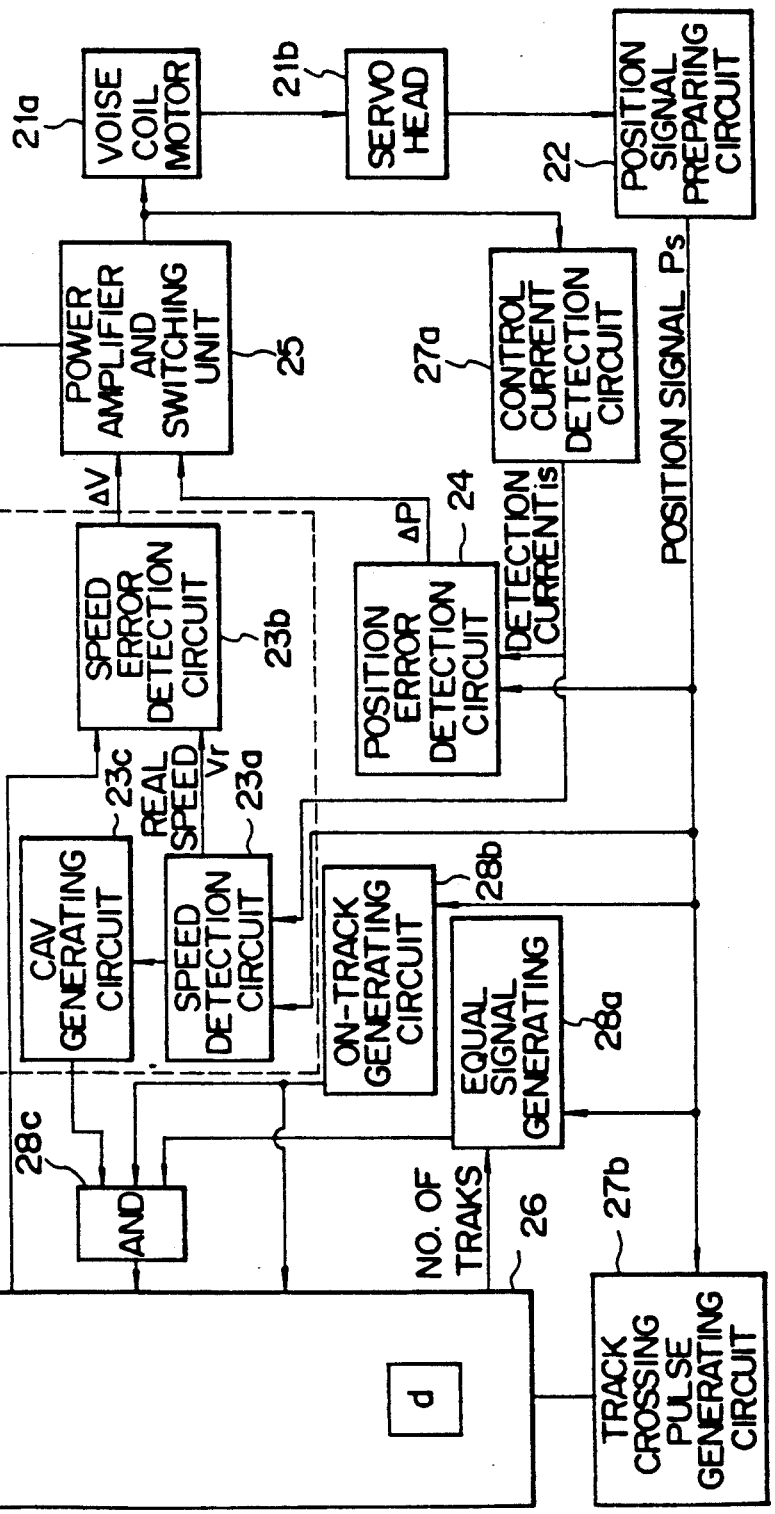
FIG. 10 is a block diagram of a third embodiment according to the present invention.

FIG. 10 is a block diagram of a fourth embodiment of the present invention.

In FIG. 10, portions the same as those shown in FIG. 8 are given the same reference numerals. Reference numeral 29b is a second timer, which is started by the MPU 26, counts a time S (for example, 3 msec), then generates a coarse/fine switching signal. Reference numeral 29c is an OR gate, which takes the OR of the outputs of the first timer 29a and second timer 29b and outputs a coarse/fine switching signal to the switching unit 25.

Figure 11:
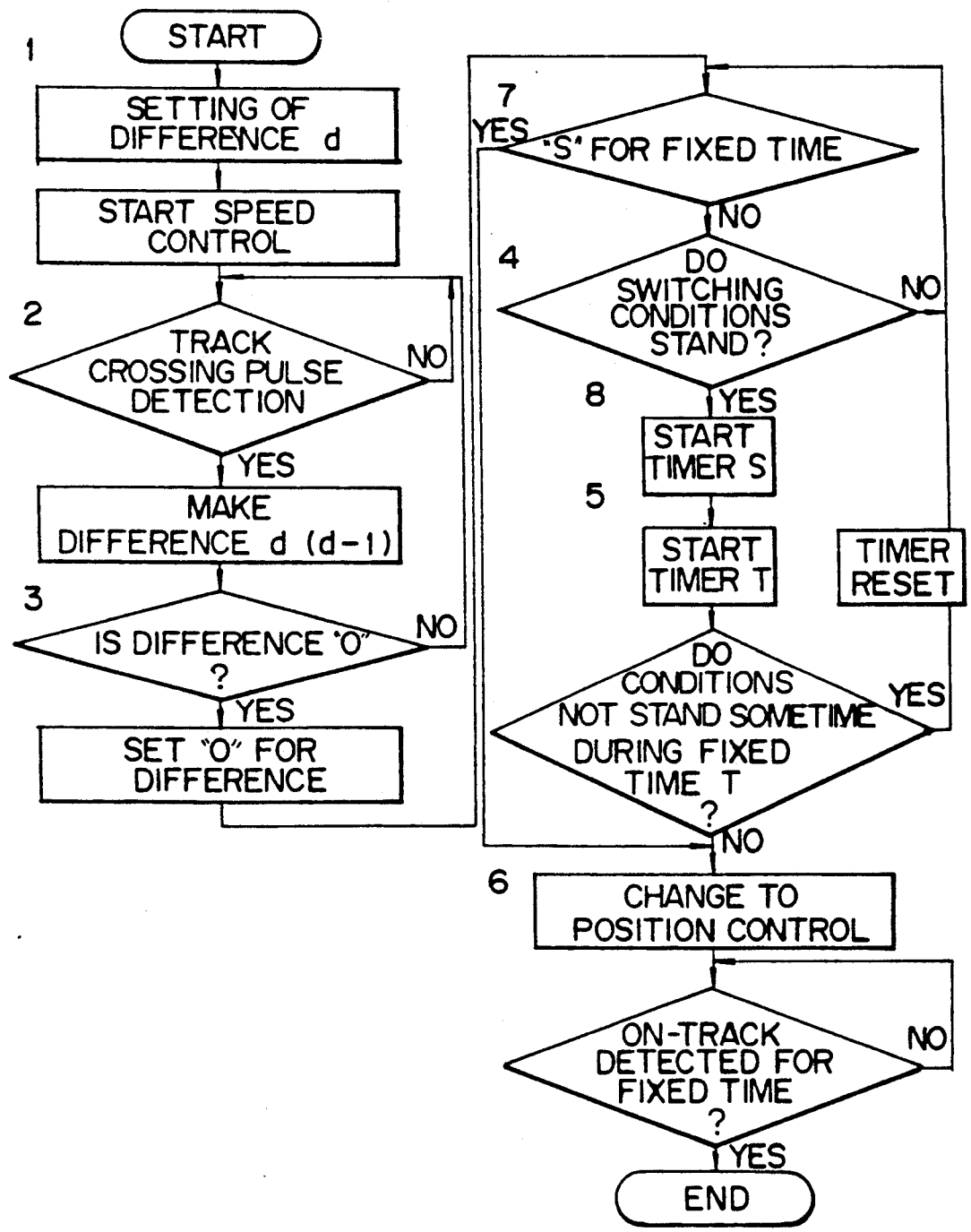
FIG. 11 is a flow chart of the processing of the third embodiment according to the present invention.

FIG. 11 is a flow chart of the processing of the fourth embodiment of the present invention.

In this embodiment, the flow of FIG. 9 is augmented with step 7 between steps 3 and 4 and a step 8 between steps 4 and 5. Referring to FIG. 11.

7 After step 3, the MPU 26 judges if the timer 29b has counted a fixed time Y. If it has not counted it, it proceeds to step 4. If it has counted it, it generates a coarse/fine switching signal through the OR gate by a count over output of the timer 29b and switches to position control.

8 If the switching conditions stand at step 4, the MPU 26 starts the timer 29b and proceeds to step 5.

Therefore, in this embodiment, when the switching conditions fail to be sustained for the fixed time T no matter how long it takes, once a fixed time S (S≧T) elapses, the MPU 26 switches automatically to position control regardless of the standing or not standing of the switching conditions.

If the state where the switching conditions fail to be sustained for the fixed time T continues forever, position control would never be entered. Therefore, the limit of the time S is established and if the switching conditions fail to be sustained for the fixed time T even after the elapse of the time S, the MPU 26 recognizes this as a seek error and switches automatically to the position control.

In the above embodiments, the timer 29a, AND gate 28c, and equal signal generating circuit 28a are formed by hardware separate from the MPU 26. The same functions may be achieved by firmware of the MPU 26. Further, the timer 29b and OR gate 29c may be realized by firmware of the MPU 26 in a similar manner.

Also, in the above embodiments, an explanation was made of the example of a magnetic disk apparatus, but the features of the invention may be applied to other apparatuses as well.

As explained above, according to the second embodiment of the present invention, after the switching conditions have been once reached, position control is switched to if the switching conditions do not collapse within a fixed time T, while if they collapse, the establishment of the switching conditions is waited for, so it is possible to prevent execution of position control in a state where the switching conditions have collapsed and to reduce error and reduce the positioning time.

Further, according to the second embodiment of the present invention, position control is automatically switched to after the elapse of the second fixed time S, so it is possible to prevent the state where the switching conditions collapse and position control is never switched.

Figure 12A:
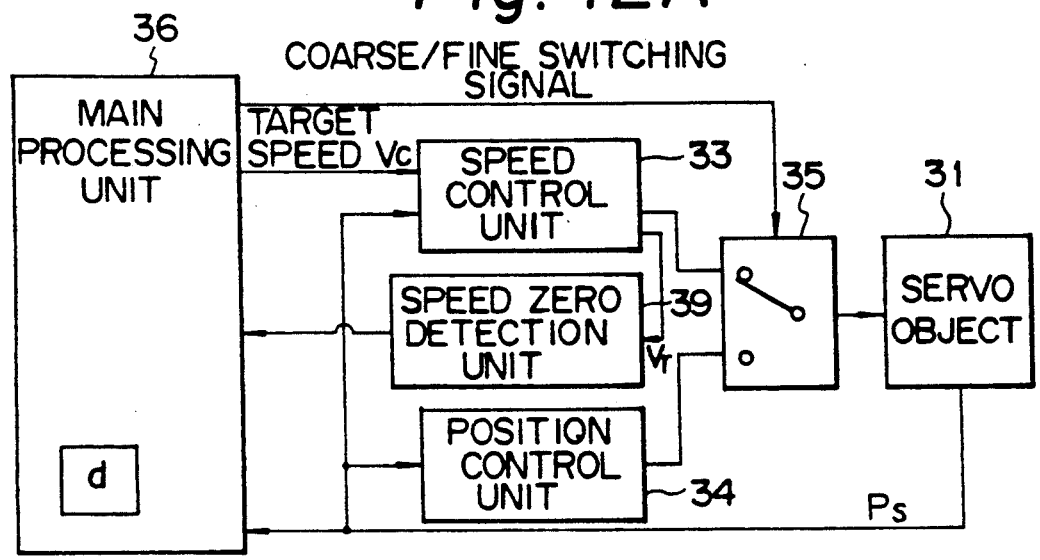
FIG. 12A is a block diagram of the third embodiment according to the present invention.
Figure 12B:
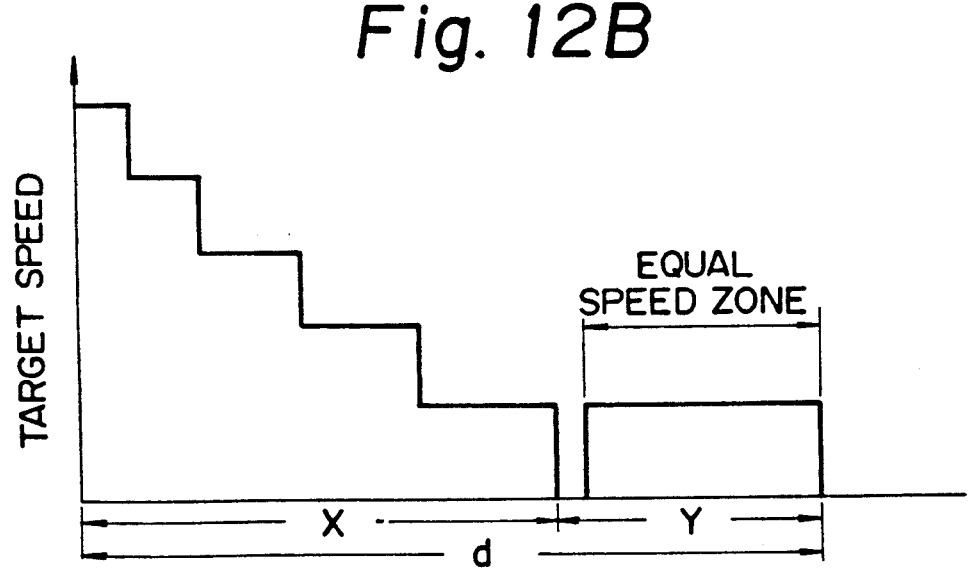
FIG. 12B is a graph of the target speed versus distance for the third embodiment according to the present invention.
Figure 13:
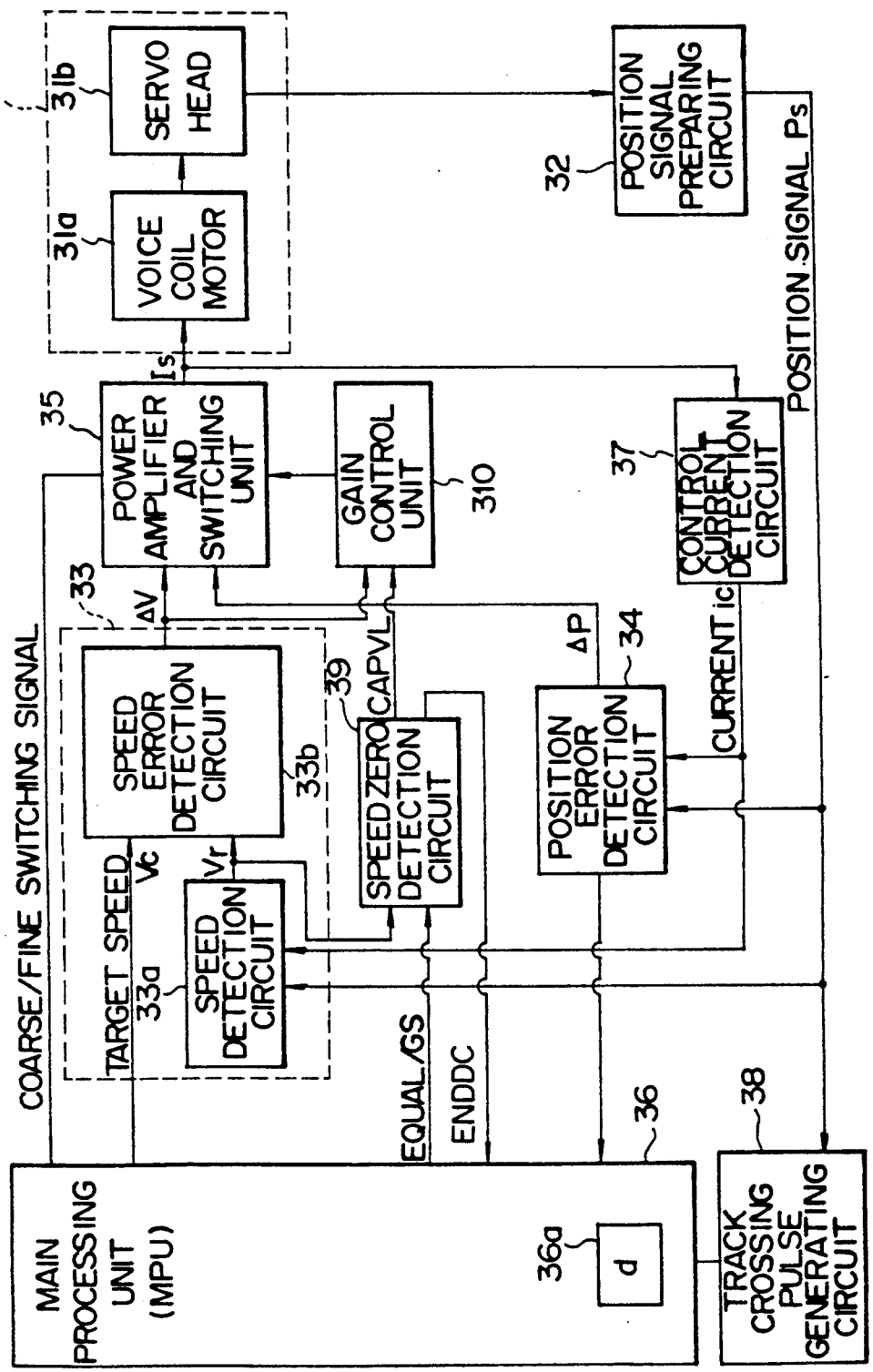
FIG. 13 is a block diagram of a fourth embodiment according to the present invention.

According to a fifth embodiment of the present invention, as shown in FIGS. 12A, 12B and 13, there is provided a control system of a servo circuit having a speed control unit 33 for controlling the speed of a servo object 31 based on an error of a given target speed and real speed; a position control unit 34 for controlling the position of the servo object 31 based on a position signal from the servo object 31; a switching unit 35 for switching the connections of the servo object 31 between the speed control unit 33 and the position control unit 34; a main processing unit 36 which revises the remaining amount of movement based on the position signal and generates a target speed in accordance with the remaining amount of movement; and a speed zero detection circuit which compares the real speed and a slice level and detects if the real speed is less than a fixed value. Based on an output of the speed zero detection circuit 39, the main processing unit 36 switches the switching unit 35 from speed control to position control. The control system produces and outputs a target speed using an amount of movement X in an amount of movement d as a remaining amount of movement, producing and outputting a target speed of an equal speed of the remaining amount of movement Y (X+Y=d), and switching the value of the slice level at the time of the start of movement and after the movement.

Explaining the mode of operation of the fifth embodiment of the present invention, first, as shown in the first embodiment, a target speed is produced using a difference X in included in a difference d as the remaining difference. A target speed of an equal speed is produced for the remaining difference Y. The equal speed target speed is used to absorb fluctuations in the entry speed, which fluctuates according to the amount of movement, and adjustments are made to substantially the same entry speed. Therefore, even if the degree of acceleration during deceleration is made large and a higher speed is attempted, no fluctuations occur in the entry speed, the amount of overshoot is kept constant, and stable position is made possible even at a high speed.

Figure 12C:
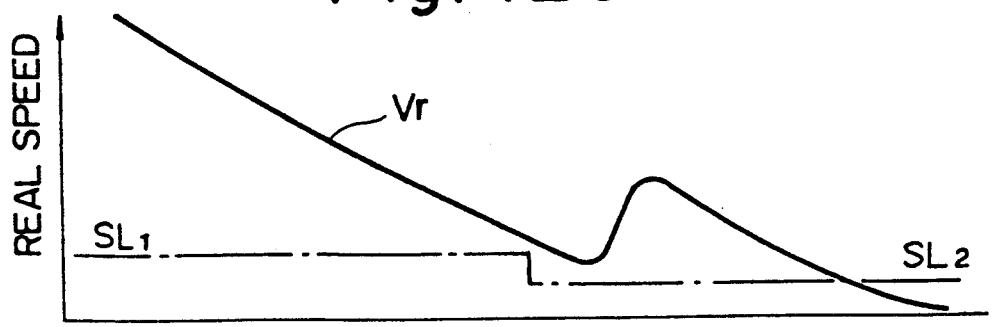
FIG. 12C is a graph of the real speed of the third embodiment according to the present invention.

Second, with such speed control, the real speed Vr follows the target speed Vc and, as shown in FIG. 12C, when the amount of movement X is completed, the speed curve Vr is crossed to a slice level $SL_1$ for the detection of the switching conditions for the speed control/position control, and position control is switched to during the equal speed zone of the amount of movement Y, resulting in erroneous operation.

Therefore, the slice level SL is switched to a low level $SL_2$ upon completion of the amount of movement X after the start of the movement so as to prevent erroneous operation and guarantee the speed control of an equal speed zone of the amount of movement Y. Also it is made possible to switch to position control at a suitable timing.

FIG. 13 is a block diagram of the fifth embodiment according to the present invention.

In FIG. 13, reference numeral 31 is a servo object, which has a voice coil motor 31a and a servo head 31b moved by the voice coil motor 31a, while reference numeral 32 is a position signal preparing circuit, which prepares a position signal from a signal read by the servo head 31b.

Reference numeral 33a is a speed detection circuit, which detects a real speed Vr from the position signal Ps and the later mentioned detection current ic. Reference numeral 33b is a speed error detection circuit, which generates a speed error ΔV between the later mentioned target speed Vc and the real speed Vr and performs speed control.

Reference numeral 34 is a position error detection circuit, which generates a position error signal ΔP from the position signal Ps and the detection current ic and performs position control. Reference numeral 35 is a power amplifier and switching unit, which has a changeover switch and power amplifier and switches connections of the speed error detection circuit 33b or position error detection circuit 34 to the servo object 31 by a coarse (speed control)/fine (position control) switching signal.

Reference numeral 36 is a main processing unit, which is formed by a microprocessor and which generates a target speed curve Vc in accordance with the amount of movement. The main processing unit 36 also monitors the position of the servo object 31 by the later mentioned track crossing pulses to generate a signal for switching from coarse control (speed control) to fine control (position control) near the target position.

Reference numeral 37 is a control current detection circuit, which detects the control current Is of the power amplifier 35 and generates a detection current signal ic. Reference numeral 38 is a track crossing pulse generating circuit, which generates track crossing pulses from the position signal Ps and outputs them to the main processing unit 36.

Reference numeral 39 is a speed zero detection circuit, which slices a real speed Vr by a predetermined slice SL to generate a speed zero signal CAPVL and an end deceleration signal ENDDC and which changes the slice level SL between a high and low stage by the command of the main processing unit (MPU) 36.

Reference numeral 310 is a gain control circuit, which detects equal speed zones from the speed error signal ΔV and the speed zero signal CAPVL and controls the gains of the amplifier of the power amplifier and switching unit 35.

Figure 14:
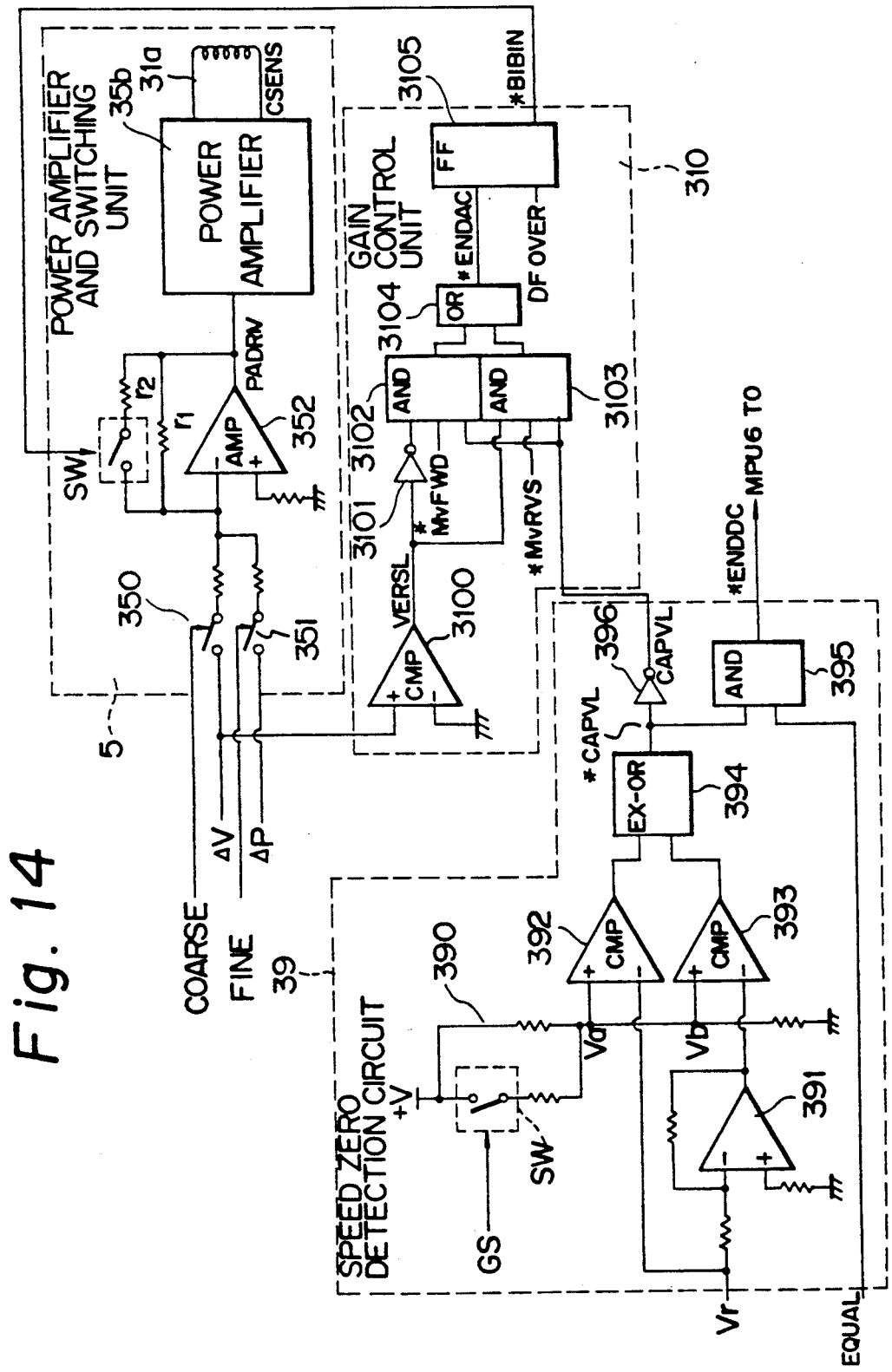
FIG. 14 is a block diagram of certain portions in FIG. 13.

FIG. 14 is a detailed block diagram of essential portions of FIG. 13.

The speed zero detection circuit 39 has a slice switching circuit 390 which switches values of the fixed value slice voltage SL (Va, Vb) by operation by a switch SW using slice switching signals GS from the MPU 36; an inversion amplifier 391 which inverts the real speed Vr; a first comparator (CMP) 392 which compares the slice voltage Va (SL) with the real speed Vr; a second comparator (CMP) 393 which compares the inverted real speed Vr with the slice voltage Vb (SL); an EX-OR circuit 394 which generates a "high" level output when the outputs of the two comparators 392 and 393 differ;

an AND circuit 395 which takes the logical AND of the speed zero signal *CAPVL of the EX-OR circuit 394 and the equal signal EQUAL output from the MPU 36 when the difference is zero; and an inversion circuit 396 which inverts the speed zero signal *CAPVL.

The gain control circuit 310 has a comparator (CMP) 3100 which performs a zero volt slice operation on the speed error signal ΔV and outputs an acceleration/deceleration signal VERSL; an inversion circuit 3101 which inverts the output of the comparator 3100; an AND gate 3102 which takes the negative logical AND (positive logical OR) of the speed zero signal CAPVL, the inversion acceleration/deceleration signal *VERSL, and the forward signal *MvFWD from the MPU 36; and AND gate 3101 which takes the negative logical AND of the speed zero signal CAPVL, the acceleration/deceleration signal VERSL, and the reverse signal *MvRVS from the MPU 36; an OR gate 3104 which takes the positive logical OR of the outputs of the two AND gates 3102 and 3103; and a flip-flop 3105 which is set by the end acceleration signal *ENDAC of the OR gate 3104, is reset by the deceleration over signal DFOVER, which is a high level signal while the target speed from the MPU 36 is not changed (while there is no deceleration), and generates the gain switching signal *BIBIN.

The power amplifier and switching unit 35 has a coarse switch 350 which turns on by a coarse command signal from the MPU 36 and outputs a speed error signal ΔV; a fine switch 361 which turns on by a fine command signal from the MPU 36 and outputs a position error signal ΔP; an amplifier 35 which amplifies the signals of the two switches 350 and 351 and switches the gain by operation of the switch SW by the gain switching signal *BIBIN; and a power amplifier 35b which passes a current CSENS to the coil of the voice coil motor 31a in accordance with a power amplifier drive output PADRV of the amplifier 352.

Figure 15:
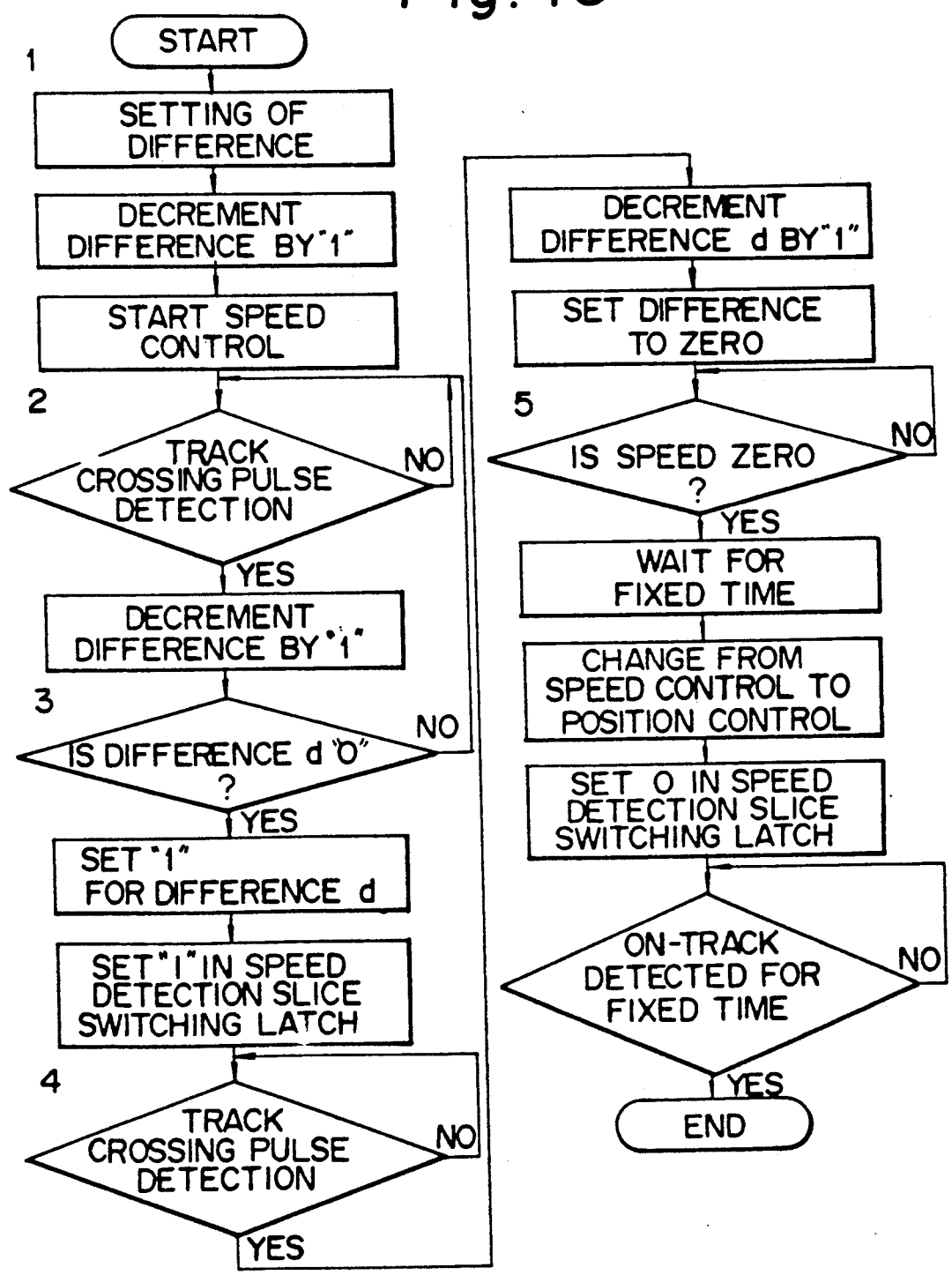
FIG. 15 is a flow chart of the seek processing of the fourth embodiment according to the present invention.
Figure 16:
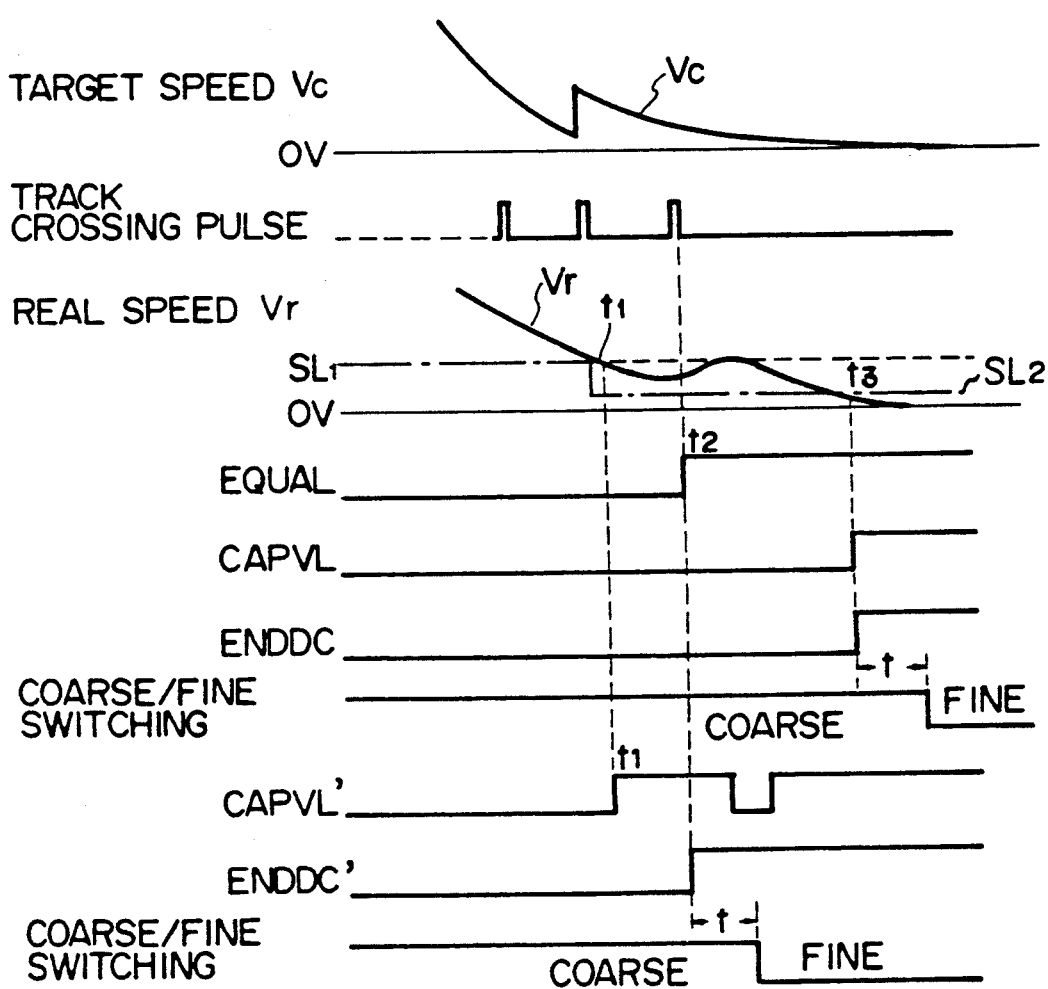
FIG. 16 is a timing diagram of the operation of the fourth embodiment according to the present invention.

FIG. 15 is a flow chart of the seek processing of the fifth embodiment of the present invention. FIG. 16 is a timing diagram of the operation of the fifth embodiment of the present invention. Referring to the figures, 1 The main processing unit (hereinafter referred to as the "MPU") 36 calculates an amount of movement (difference) d from the target track position given by a higher unit and the current track position and sets it in the difference counter 36a.

Next, the difference d of the difference counter 36a is decremented by "1". That is, the difference d is reduced by "1" in advance.

Then the MPU 36 generates a target speed according to the difference d to start the speed control.

2 The MPU 36 monitors the track crossing pulses of the track crossing pulse generating circuit 38 and when detecting a track crossing pulse, revises the difference counter 36a to (d-1) and issues a target speed according to that difference d.

3 The MPU 36 judges if the difference d is zero and if not zero returns to step 2.

On the other hand, if the MPU 36 judges that the difference is zero, it judges that the seek operation of the difference (d-1) is completed, sets "1" in the difference counter 36a so as to perform the seek operation for the remaining "1", and generates a target speed according to this difference d.

Along with this, the MPU 36 sets "1" in the speed detection slice switching latch (not shown), makes the slice switching signal GS "1", turns the switch SW of the slice switching circuit 390 of FIG. 14 off, and makes the slice voltage SL the low level.

That is, in performing the seek operation of the remaining "1", as shown in FIG. 16, the slice level SL is made the low level.

4 Next, the MPU 36 monitors the track crossing pulses from the track crossing pulse generating circuit 38 and if it detects a track crossing pulse, decrements the difference d of the difference counter 36a by "1".

By this, the difference d of the difference counter 36a becomes zero, so the MPU 36 sets the difference to zero and outputs an equal signal EQUAL to the speed zero detection circuit 39.

That is, it judges that the seek operation of the difference of 1 is completed.

5 Next, the MPU 36 judges if the speed is zero by the end deceleration signal *ENDDC of the speed zero detection circuit 39.

If the end deceleration signal *ENDDC rises, it is considered that the real speed has become zero. The MPU 36 waits a fixed time, then turns off the switch 350 by a coarse/fine switching signal, turns on the switch 351, and thus switches from speed control to position control.

Next, the MPU 36 sets the speed detection slice switching latch to "0", turns on the switch SW of the circuit 390, and makes the slice voltage the high level.

Then, the MPU 36 monitors the on-track signal of the position error detection circuit 34 (signal showing that servo head is within fixed distance of target track) and if it detects an on-track state for a fixed period, ends the operation judging that the positioning is completed.

Explaining this operation referring to FIGS. 6A and 6B as explained above, first the amount of movement d (=5) is decremented by "1" and a seek operation for the position (d-1) (=4) is executed.

After this, a seek operation for the position of the remaining "1" is executed.

This seek operation of the position of the remaining "1" means movement of a position of "1", so an equal speed target speed is given and an equal speed seek operation performed.

That is, under the conditions of X=d-1 and Y=1, the seek operation of the difference d is split into two seek operations.

Showing this by tracks of a magnetic disk, the seek operation of the position (d-1) is performed until 1.5 tracks before the target track, then a seek operation of a position of 1 of an equal speed is performed from before the 1.5 track to before the 0.5 track. The seek current becomes as shown in FIG. 6B.

The target speed Vc from MPU 36 takes a step-like form as shown by FIG. 6A, of "4", "3", "2", "1", and "0", then "1" and "0". By running this through a smoother circuit, not shown, of the speed error preparing circuit 33b, the continuous Vcs of FIG. 6A is obtained, which draws a curve which decreases from d=4 to d=0, rises by the d=1 after d=0 and then decreases again.

Therefore, even when the degree of acceleration during deceleration is large and the entry speed fluctuates, the fluctuations are absorbed by the fixed speed and equal speed seek zones. The speed control can be ended at substantially the same entry speed.

Next, the reason why the slice level SL is switched from the high level to the low level is that, as shown by FIG. 16 the target speed Vc rises due to the seek operation for the position "1", after the seek operation of the position (d-1). The real speed Vr follows this, forming a peak after once falling, as shown in the figure.

In such a case, if slice level $SL_1$ is to be prevented from changing as shown by the dotted line, the real speed Vr crosses the slice level $SL_1$ at t1 immediately after the seek operation of the position (d-1), a speed zero signal such as CAPVL' is ON from time $t_1$, an end deceleration signal such as ENDDC' is generated at the time t2 of the difference zero, and, after the elapse of the time t, fine control is switched on.

This means a shift to fine control at the point of the peak of the real speed Vr, making it impossible to enjoy the full effects of the equal speed seek operation. Further, fine control is performed at the time when the real speed Vr is large, so overshoot is caused and the limit time becomes longer.

Therefore, at the point of time $t_3$ when the slice level $SL_1$ is switched to the low level $SL_2$, the peak of the real speed Vr is passed, and the real speed Vr sufficiently falls, the speed zero signal CAPVL is generated, the end deceleration signal ENDDC is generated, and then the switching to the fine control is performed.

By this, the effects of an equal speed seek operation can be fully enjoyed and fine control is switched to at the point of time when the real speed Vr sufficiently falls, so the overshoot can be reduced and the limit time made shorter.

If the slice level SL is fixed to the low level $SL_2$ from the start, troubles will occur as explained with reference to FIG. 17 and FIG. 18.

The gain control circuit 310 explained in FIG. 13 and FIG. 14 detects the equal speed zones from the speed zero signal CAPVL, turns on the switch SW of the amplifier 352 of FIG. 14, reduces the amplifier gain, and prevents vibration of the type easily occurring with equal speed control.

Figure 17:
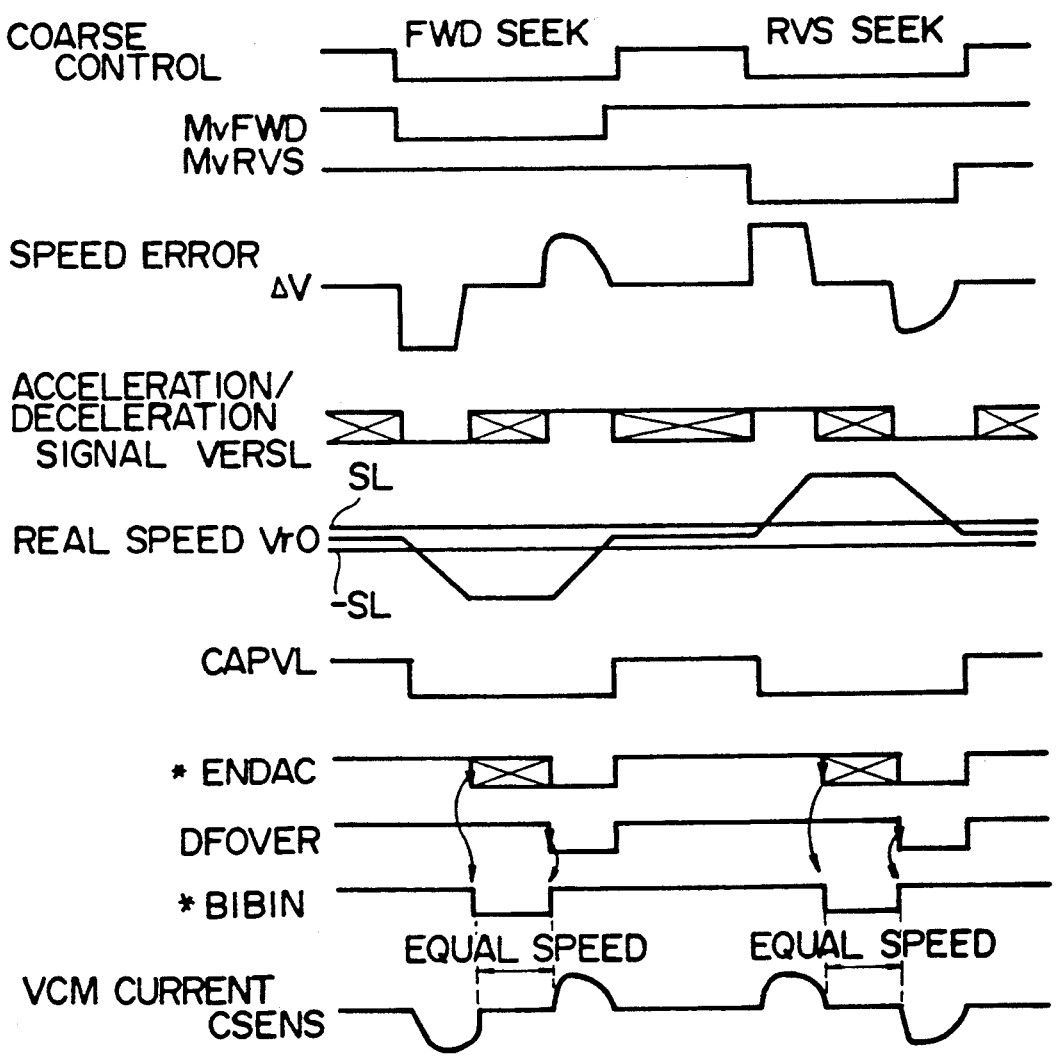
FIGS. 17 and 18 are timing diagrams of the gain control operation of the fourth embodiment according to the present invention.
Figure 18:
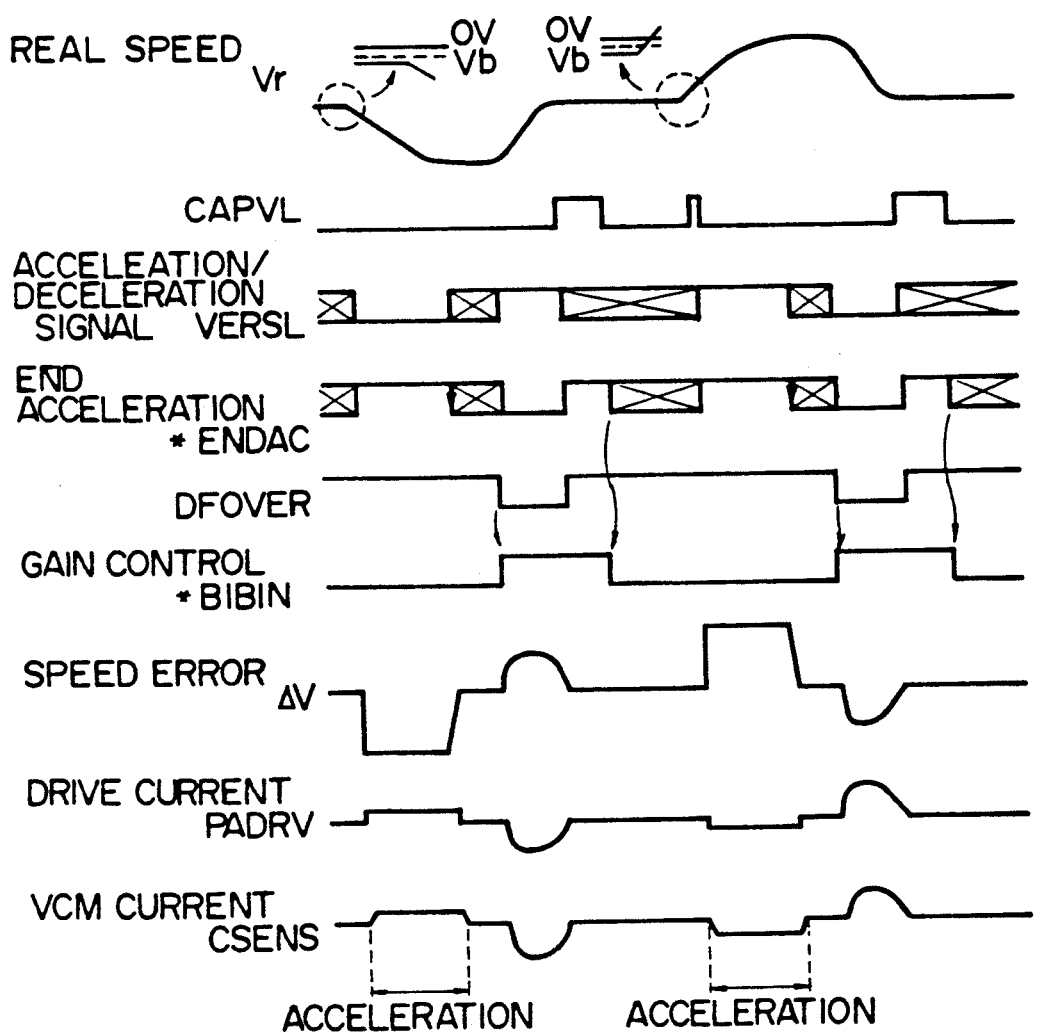

Further, in FIG. 17 and FIG. 18, for simplification of the explanation, no explanation is made using the two stage seek operation of FIG. 6.

FIG. 17 shows the ordinary operation. If the slice level SL is a high level with respect to the real speed Vr, irregardless of the offset of the real speed Vr, the speed zero signal CAPVL becomes the low level during the acceleration, equal speed, and deceleration and otherwise becomes the high level.

On the other hand, the speed error signal ΔV is detected as the acceleration/deceleration signal VERSL by the comparator 3100 of the gain control circuit 310.

Therefore, the end acceleration signal *ENDAC showing the end of the acceleration is output from the AND gate 3104 through the AND gate 3102 and 3103, and the equal speed zone low level gain switching signal *BIBIN is output from the flip-flop 3105.

By this, the switch SW of the amplifier 352 is turned off, the equal speed zone gain is reduced, and the VCM current CSENS of the power amplifier 35b no longer causes vibration in the equal speed zone.

As opposed to this, if the slice level SL is fixed to the low level, as shown in FIG. 18, the offset of the real speed Vr at the start of the seek operation will exceed the slice level SL (Vb) and the speed zero signal CAPVL will be considered the low level from before the start of the seek operation.

Therefore, the end acceleration signal *ENDAC will be output from the OR gate 3104 from before the start of the seek operation, the flip-flop 3105 will be reset, the gain signal will be at a low level from before the seek operation, and the gain of the amplifier 352 will end up reduced.

Due to this, since the amplifier 352 will have a low gain even during the acceleration period after the start of the seek operation, as shown in FIG. 18, the current during the acceleration (drive current PADRV, VCM current CSENS) will become small and the necessary acceleration will not be possible.

In this way, there is a problem with making the slice level a low level in advance. At the very least, the slice level needs to be made high at the start of the seek operation.

From the above, at the first stage, the slice level is made high ($SL_1$) and, as explained with reference to FIG. 15 and FIG. 16, at the second stage of positioning of "1", the slice level is switched to the low level ($SL_2$). After switching to the position control, the slice level is returned to the high level.

In the above embodiment, the slice level was made the low level from the start of the seek operation of the position "1" to switching to the position control. But as mentioned earlier the reason why trouble is caused if the slice level is kept the low level is the offset of the real speed Vr, so it is possible to maintain a high slice level until the start of the seek operation and then switch to the low level.

As explained above, according to the fifth embodiment of the present invention, since the target speed is produced using the amount of movement X in the amount of movement d as the remaining amount of movement and an equal speed target speed is produced for the remaining amount of movement Y, the fluctuations in the entry speed, which fluctuates according to the amount of movement, are absorbed by the equal speed seek zones and substantially the same entry speed can be adjusted to. Even with a large degree of acceleration during deceleration, it is possible to keep the overshoot constant and achieve high speed, stable positioning.

Further, even with such a speed control, since the slice level is switched, the effects of the speed control by the equal speed target speed can be fully enjoyed and it is possible to switch to position control at a suitable timing.

In the above embodiment, an explanation was made of the example of a magnetic disk apparatus, but the invention may be applied to other apparatuses as well. Also, an explanation was made using a position of Y=1, but other values may be used as well.

Above, an explanation was made using embodiments, but the present invention may be modified in many ways within the scope of the gist of the invention. These modifications are not excluded from the present invention.

We claim:

1. A control system of a servo circuit for performing speed control and then position control based on a difference representing a change in an amount of movement of an object under servo control, said control system comprising:
    speed control means for controlling the speed of the servo object based on an error between a target speed and a real speed obtained from a position signal indicating the present position of the object;
    position control means for controlling the position of the object to a target position;

switching means for switching the connection of the object between said speed control means and said position control means; and main processing means for revising the difference based on the position signal from the object and generating first and second target speeds in accordance with the difference, the first target speed being generated for a first difference (X) and, after generating the first target speed for the first difference (X), generating a second target speed having a constant speed for a second difference (Y), where, X+Y=d, d being the difference.

2. A control system of a servo circuit as claimed in claim 1, wherein said main processing means comprises a difference counter for setting the difference d calculated from a target track position and a current track position.

3. A control system of a servo circuit as claimed in claim 2, wherein the remaining difference (X) corresponds to the difference "d-1" and the remaining difference (y) corresponds to the difference "1", respectively.

4. A control system of a servo circuit as claimed in claim 3, wherein said second target speed having a constant speed is applied to the remaining difference (Y) as a one position seek operation having constant entry speed.

5. A control system of a servo circuit as claimed in claim 2, wherein the difference d of the difference counter is decremented in advance by "1".

6. A control system of a servo circuit as claimed in claim 5, wherein the remaining difference (X) corresponds to the difference "d-1" and the remaining difference (y) corresponds to the difference "1", respectively.

7. A control system of a servo circuit as claimed in claim 6, wherein said second target speed having a constant speed is applied to the remaining difference (Y) as a one position seek operation having constant entry speed.

8. A control system of a servo circuit as claimed in claim 1, wherein the remaining difference (X) corresponds to the difference "d-1" and the remaining difference (Y) corresponds to the difference "1", respectively.

9. A control system of a servo circuit as claimed in claim 8, wherein said second target speed having a constant speed is applied to the remaining difference (Y) as a one position seek operation having constant entry speed.

10. A control system of a servo circuit as claimed in claim 1, wherein said second target speed having equal speed is applied to the remaining difference (Y) as a one position seek operation having constant entry speed.

11. A control system of a servo circuit for performing speed control and then position control of an object under servo control, said control system comprising:

speed control means for controlling the speed of the object based on an error between a target speed and a real speed obtained from a position signal;

position control means for controlling the position of the object to the target position;

switching means for switching the connection of the servo object between said speed control means and said position control means;

main processing means for controlling the switching of said switching means in the position control in such a way that said main processing means determines if the conditions for switching to position control are met during speed control, monitors the conditions for switching for a first fixed time after detection of said switching conditions, switches to position control in accordance with detecting of the switching conditions for the first fixed time, and returns to the step of determining the switching conditions when the switching conditions collapse within the first fixed time, said main processing means also controlling the switching of said switching means in such a way that said main processing means switches to position control regardless of the switching conditions being met after the elapse of a second fixed time after the switching conditions have been detected;

first timer means for counting the first fixed time and generating a coarse/fine switching signal; and second timer means for counting the second fixed time and generating the coarse/fine switching signal.

12. A control system of a servo circuit for performing speed control and then position control based on a difference representing an amount of movement of an object under servo control, said control system comprising:

speed control means for controlling the speed of the object based on an error of a target speed and real speed obtained from a position signal;

position control means for controlling the position of the object based on the position signal from the object;

switching means for switching the connection of the object between said speed control means and said position control means;

speed zero detection means for comparing the real speed with a threshold level and detecting if the real speed is less than the threshold level; and main processing means for revising the difference based on the position signal from the object, generating first and second target speeds in accordance with the difference, and switching said switching means for speed control to position control based on an output of the speed zero detection means, the first target speed being generated for a first difference (X), after generating the first target speed for the first difference (X), generating the second target speed having a constant speed for a second difference (Y), where X+Y=d, d being the difference, and the threshold level being switched from the high level to the low level at the time of the start of movement and after the movement.

13. A control system of a servo circuit as claimed in claim 12, wherein switching from the high level to the low level is performed at the start of the seek operation for the position "1" after the seek operation of the position "d-1".

14. A method for performing speed control and then position control for a servo circuit, said method comprising the steps of:

a) calculating an amount of movement based on a target track position and a current track position;

b) decrementing a difference in a difference counter by "1";

c) monitoring and detecting track crossing pulses and generating a target speed according to the difference;

d) determining whether the difference is zero;

e) repeating steps c) and d) if the difference is not zero;

f) determining if the real speed of a speed detection circuit is zero;
g) waiting a first predetermined time after the real speed becomes zero to switch from speed control to position control regardless of switching conditions, switching control from coarse to fine being met after the elapse of a second predetermined time;
h) monitoring an on-track signal; and
i) ending operation when the on-track state is detected for a predetermined time period.

* * * * *

UNITED STATES PATENT AND TRADEMARK OFFICE
CERTIFICATE OF CORRECTION

PATENT NO. : 5,194,798
DATED : MARCH 16, 1993
INVENTOR(S) : SHUICHI HASHIMOTO ET AL.

It is certified that error appears in the above-indentified patent and that said Letters Patent is hereby corrected as shown below:

Col. 1, line 10, "(hereinafter)" should be --(hereinafter--.

Col. 2, line 36, "featuring a" should be deleted.

Col. 3, line 14, "t he" should be --the--;
line 27, "operation" should be deleted;
line 30, "signal" should be --signals--;
line 67, "object;" should be --object 1;--.

Col. 4, line 19, "of" should be deleted;
line 50, "another prior" should be --another example of the prior--.

Col. 6, line 51, "control" should be --control.--.

Col. 7, line 51, "and an" should be --diference and an--.

Col. 8, line 50, "21a." should be --21b.--.

UNITED STATES PATENT AND TRADEMARK OFFICE
CERTIFICATE OF CORRECTION

PATENT NO. : 5,194,798
DATED : March 16, 1993
INVENTOR(S) : Shuichi Hashimoto, et al.

It is certified that error appears in the above-indentified patent and that said Letters Patent is hereby corrected as shown below:

Col. 13, line 15, "3101" should be --3103--;
        line 30, "361" should be --351--.

Col. 16, line 46, "embodiment," should be --embodiments,--.

Signed and Sealed this

Twenty-eighth Day of June, 1994

Attest:

BRUCE LEHMAN

Attesting Officer     Commissioner of Patents and Trademarks